(12) United States Patent
Saisho et al.

(10) Patent No.: US 10,696,159 B2
(45) Date of Patent: Jun. 30, 2020

(54) INFORMATION PROVIDING APPARATUS

(71) Applicant: Ricoh Company, Ltd., Tokyo (JP)

(72) Inventors: Kenichiroh Saisho, Tokyo (JP);
Hiroshi Yamaguchi, Kanagawa (JP);
Masato Kusanagi, Kanagawa (JP);
Yuuki Suzuki, Kanagawa (JP); Keita Katagiri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/103,421

(22) Filed: Aug. 14, 2018

(65) Prior Publication Data
US 2019/0061529 A1 Feb. 28, 2019

Related U.S. Application Data

(63) Continuation of application No. PCT/JP2017/004880, filed on Feb. 10, 2017.

(30) Foreign Application Priority Data

Feb. 18, 2016 (JP) .................. 2016-029085

(51) Int. Cl.
*G02B 27/01* (2006.01)
*B60K 35/00* (2006.01)
(Continued)

(52) U.S. Cl.
CPC ............ *B60K 35/00* (2013.01); *B60R 11/02* (2013.01); *G01C 21/36* (2013.01); *G02B 26/10* (2013.01);
(Continued)

(58) Field of Classification Search
CPC ............................ B60K 35/00; B60K 2370/31
(Continued)

(56) References Cited

U.S. PATENT DOCUMENTS 7,616,364 B2 11/2009 Saisho et al.
7,672,032 B2 3/2010 Hayashi et al.
(Continued)

FOREIGN PATENT DOCUMENTS

EP 3 145 183 A1 3/2017
JP 2006-017626 1/2006
(Continued)

OTHER PUBLICATIONS

Extended European Search Report dated Nov. 12, 2018 in corresponding European Patent Application No. 17753087.0 citing documents AA, AO and AP therein, 12 pages.
(Continued)

*Primary Examiner* — Calvin C Ma
(74) *Attorney, Agent, or Firm* — Xsensus LLP

(57) ABSTRACT

An information providing apparatus includes one or more processors; and a memory storing instructions, which when executed by the processors, cause the processors to acquire, by a display unit, information on a predetermined position outside a moving body to display an information providing image for providing information associated with the predetermined position as a virtual image; and control the display unit to change a display position of the information providing image according to movement of the moving body. The display position of the information providing image is changed such that a deviation amount between the predetermined position and a position at which a straight line passing through a reference point within the moving body and the display position of the information providing image reaches a surface on which the moving body is moving decreases as a distance between the moving body and the predetermined position decreases.

14 Claims, 18 Drawing Sheets

(51) Int. Cl.
  *B60R 11/02* (2006.01)
  *G01C 21/36* (2006.01)
  *G02B 26/10* (2006.01)
  *G08G 1/0968* (2006.01)
  *G09G 3/00* (2006.01)
(52) U.S. Cl.
  CPC ............ *G02B 27/01* (2013.01); *G08G 1/0968* (2013.01); *G09G 3/001* (2013.01); *B60K 2370/179* (2019.05); *B60K 2370/186* (2019.05); *B60K 2370/21* (2019.05); *B60K 2370/31* (2019.05); *B60K 2370/334* (2019.05); *G09G 2340/0471* (2013.01); *G09G 2380/10* (2013.01)
(58) Field of Classification Search
  USPC .............................. 345/7, 8, 9, 419, 426, 690
  See application file for complete search history.

(56) References Cited

U.S. PATENT DOCUMENTS

| | | | |
|---|---|---|---|
| 7,688,491 B2 | 3/2010 | Saisho et al. | |
| 7,817,177 B2 | 10/2010 | Hayashi et al. | |
| 7,856,750 B2* | 12/2010 | Sammut | F41G 1/38 42/122 |
| 7,876,486 B2 | 1/2011 | Saisho et al. | |
| 8,045,248 B2 | 10/2011 | Watanabe et al. | |
| 8,059,149 B2 | 11/2011 | Saisho et al. | |
| 8,172,139 B1* | 5/2012 | McDonald | F41G 3/02 235/404 |
| 8,213,067 B2 | 7/2012 | Saisho | |
| 8,368,736 B2 | 2/2013 | Saisho et al. | |
| 8,531,766 B2 | 9/2013 | Tokita et al. | |
| 8,559,053 B2 | 10/2013 | Saisho et al. | |
| 8,848,013 B2 | 9/2014 | Saisho et al. | |
| 8,876,294 B2 | 11/2014 | Saisho et al. | |
| 8,884,975 B2 | 11/2014 | Satoh et al. | |
| RE45,918 E | 3/2016 | Saisho et al. | |
| 9,519,640 B2* | 12/2016 | Perez | G02B 27/017 |
| 2008/0091338 A1 | 4/2008 | Uehira | |
| 2011/0298693 A1 | 12/2011 | Tasaki et al. | |
| 2013/0120224 A1* | 5/2013 | Cajigas | G09G 5/00 345/8 |
| 2016/0121794 A1 | 5/2016 | Iguchi | |
| 2016/0159280 A1 | 6/2016 | Takazawa et al. | |
| 2016/0170487 A1 | 6/2016 | Saisho | |
| 2016/0313562 A1 | 10/2016 | Saisho et al. | |
| 2017/0054973 A1 | 2/2017 | Kasazumi et al. | |

FOREIGN PATENT DOCUMENTS

| | | |
|---|---|---|
| JP | 2010-139589 | 6/2010 |
| JP | 2015-000630 | 1/2015 |
| JP | 2015-011666 | 1/2015 |
| JP | 2015-077876 | 4/2015 |
| JP | 2015-126956 | 7/2015 |
| JP | 2016-203850 | 12/2016 |
| WO | WO 2015/174050 A1 | 11/2015 |

OTHER PUBLICATIONS

International Search Report dated Mar. 14, 2017 in PCT/JP2017/004880 filed on Feb. 10, 2017(with English translation), citing documents AS, AT and AU therein. 3 pages.

\* cited by examiner

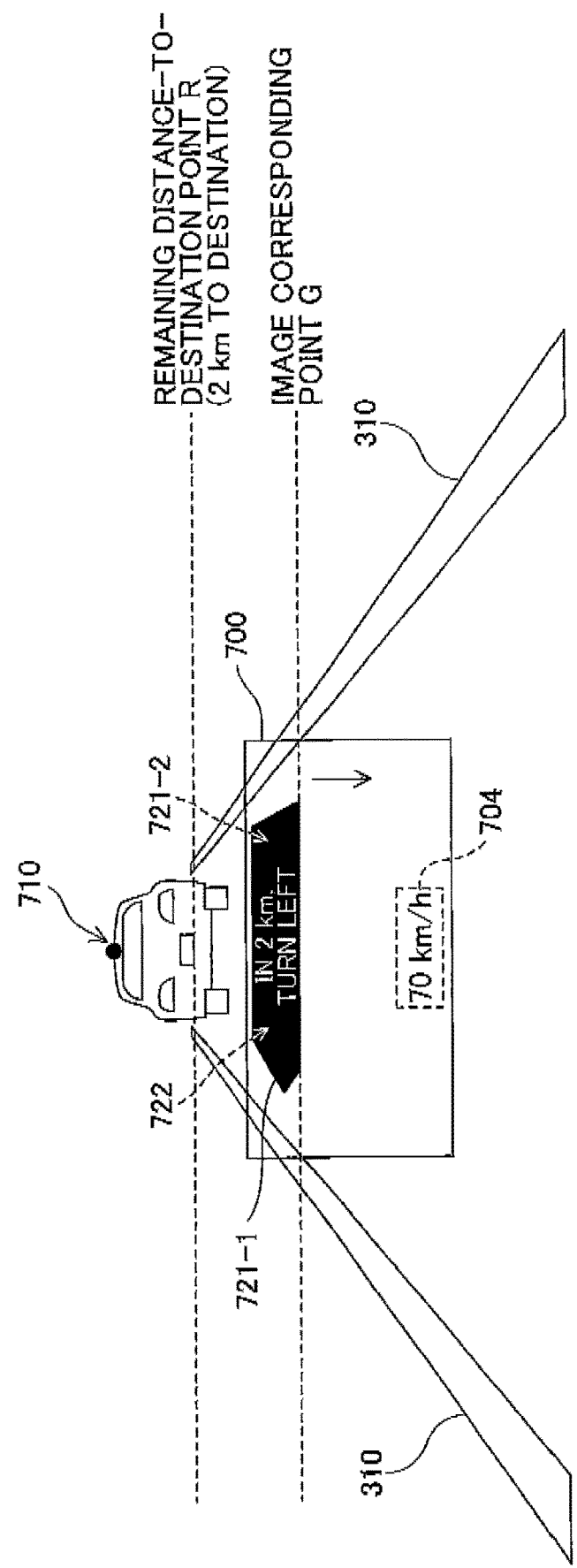

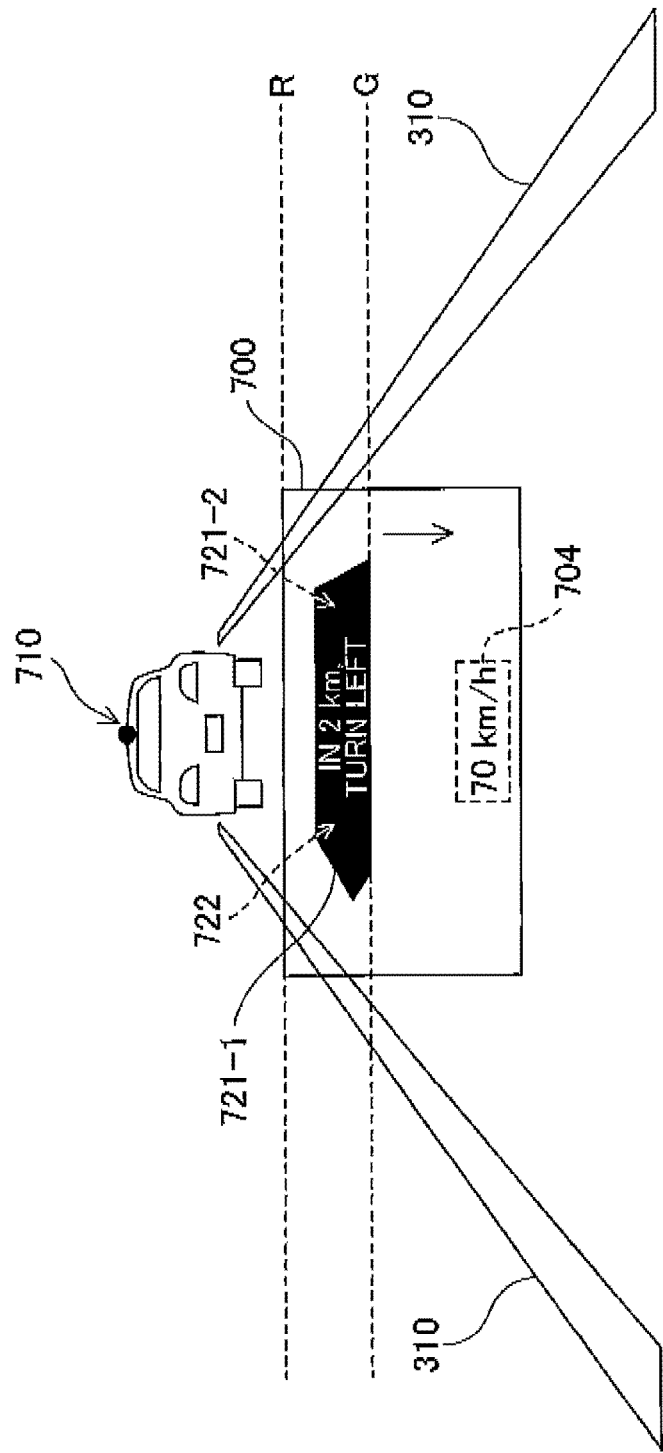

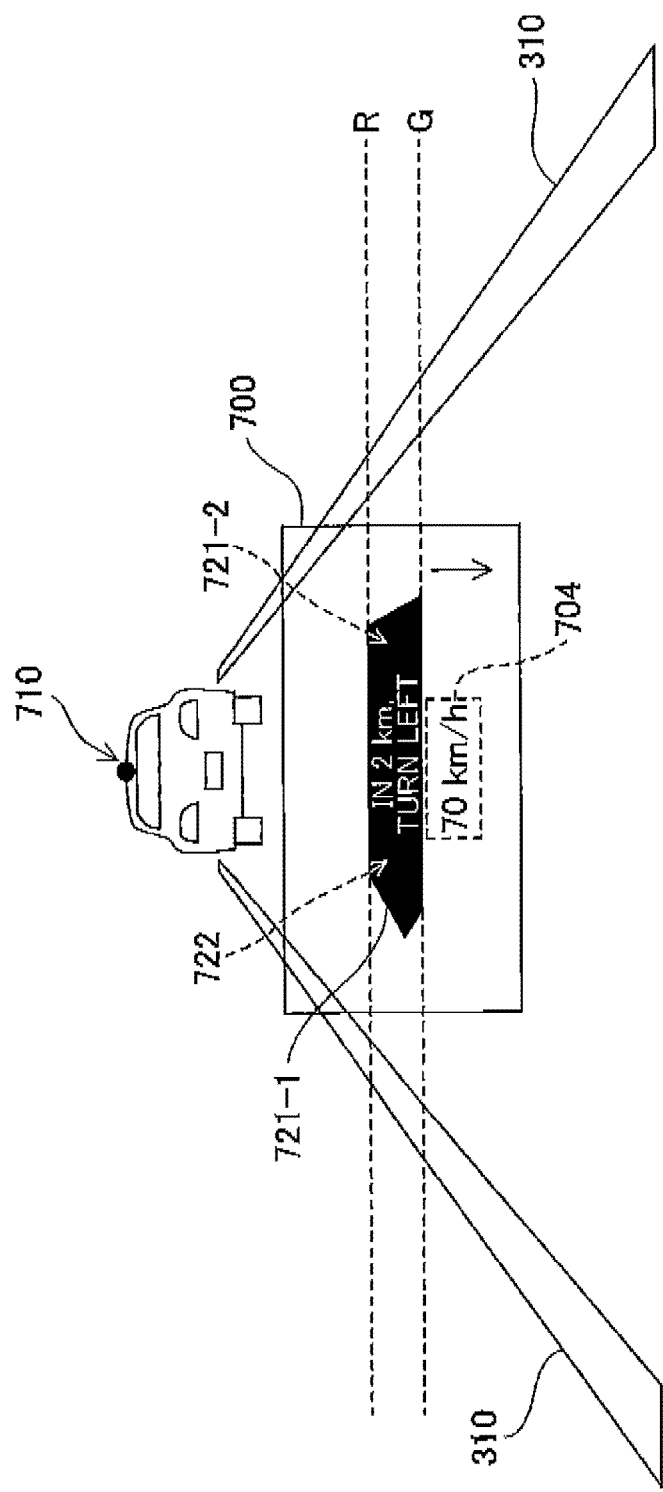

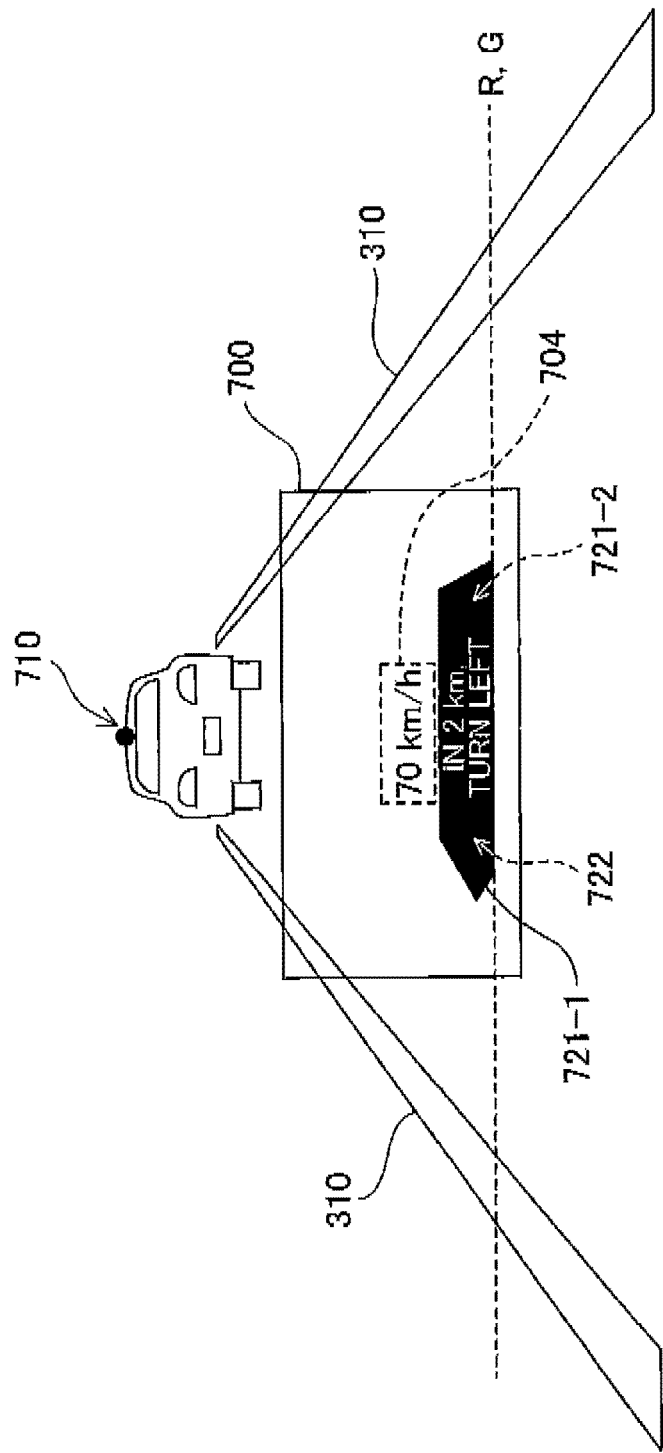

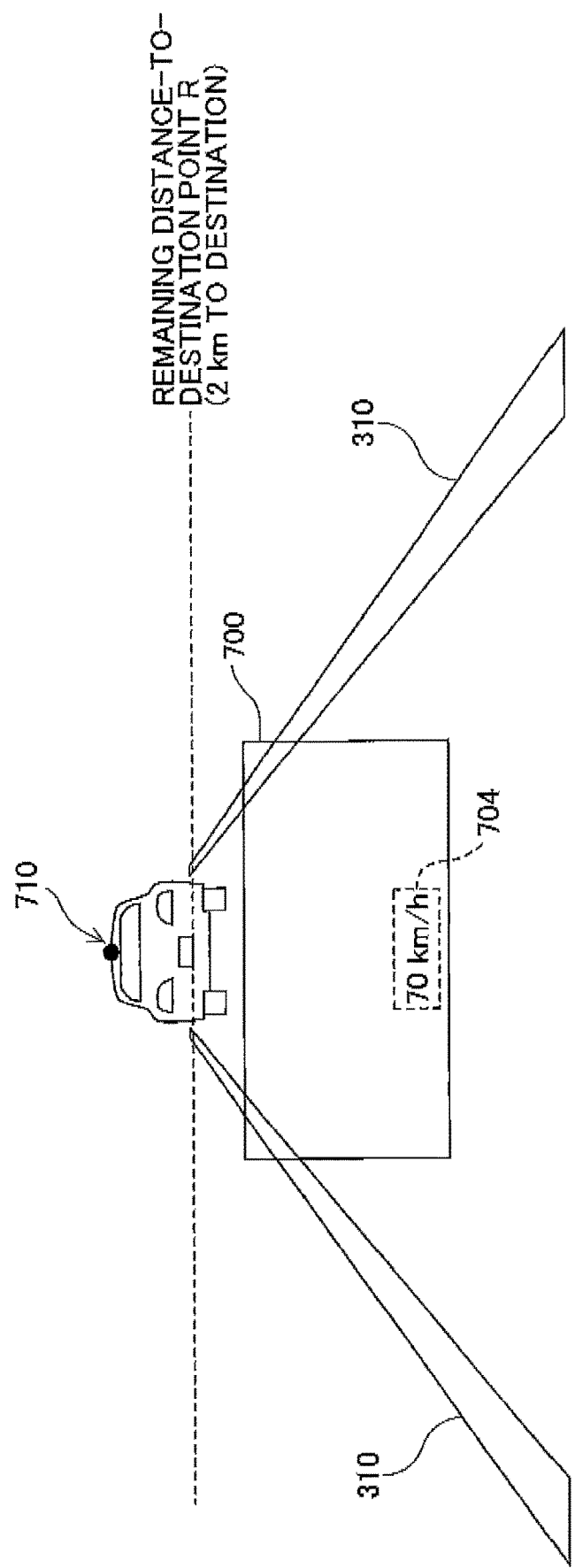

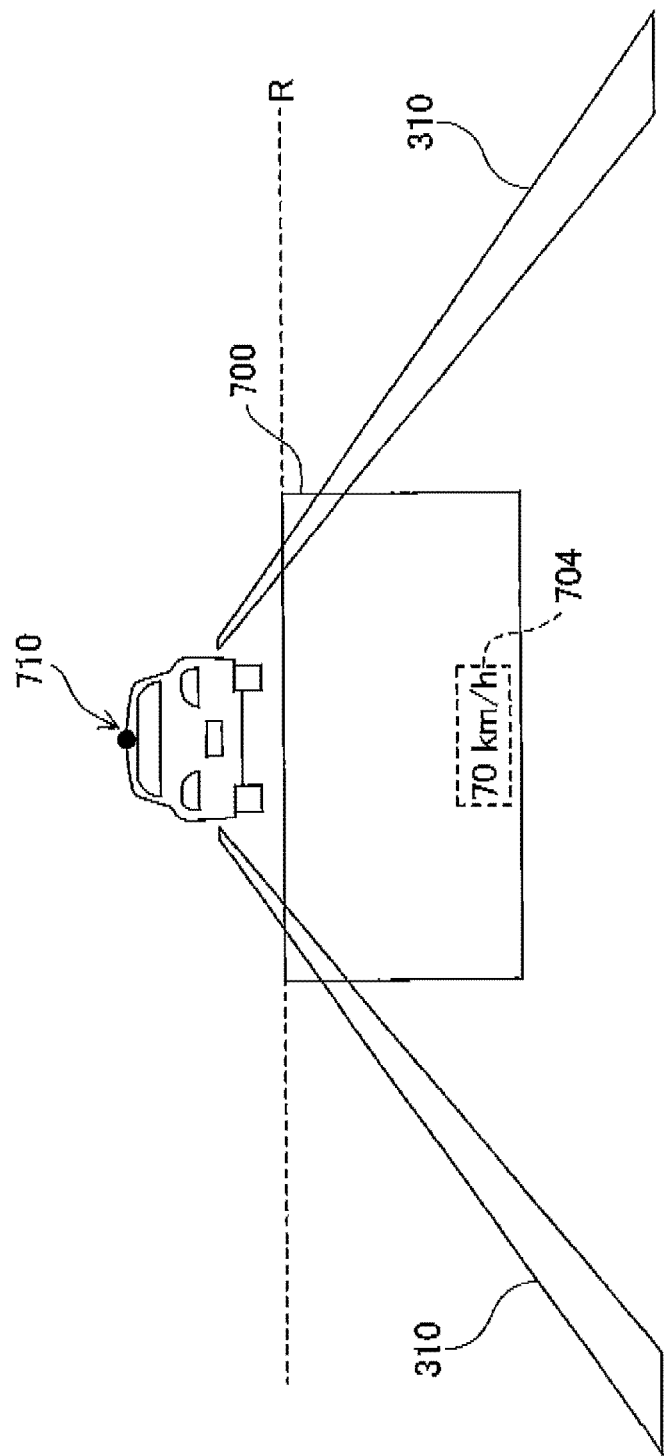

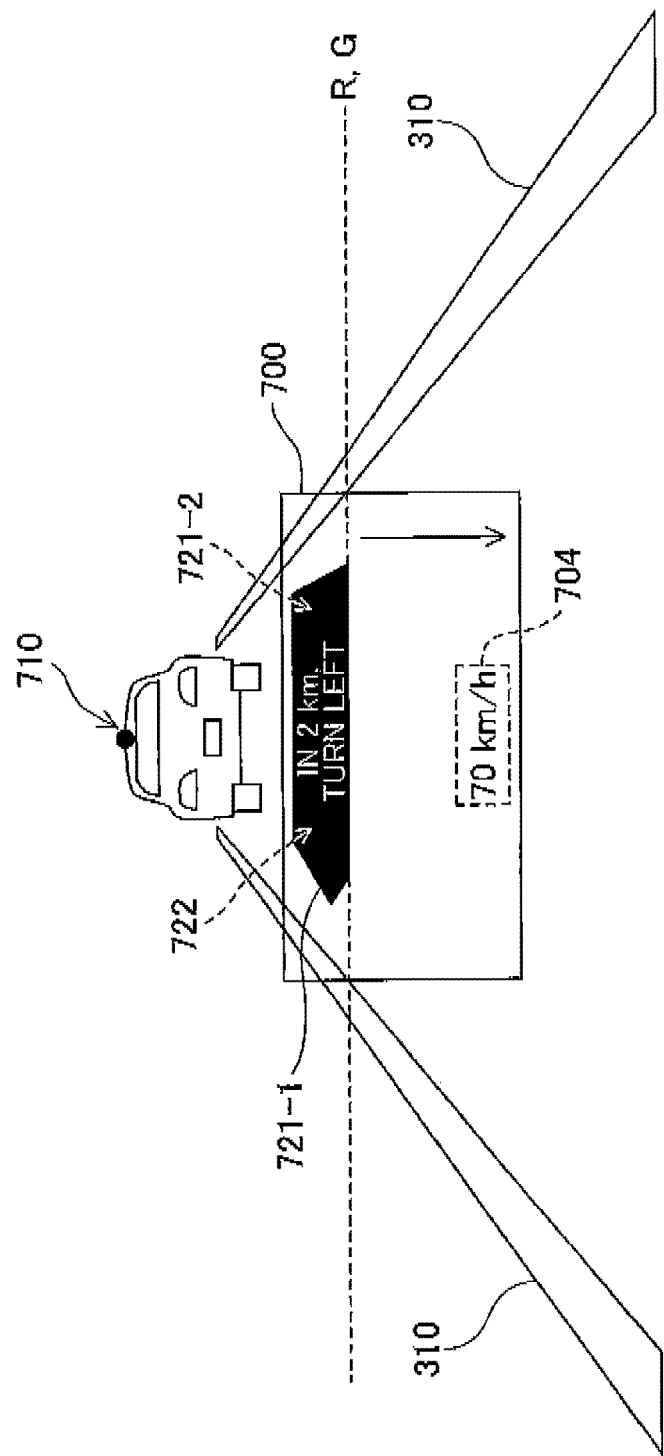

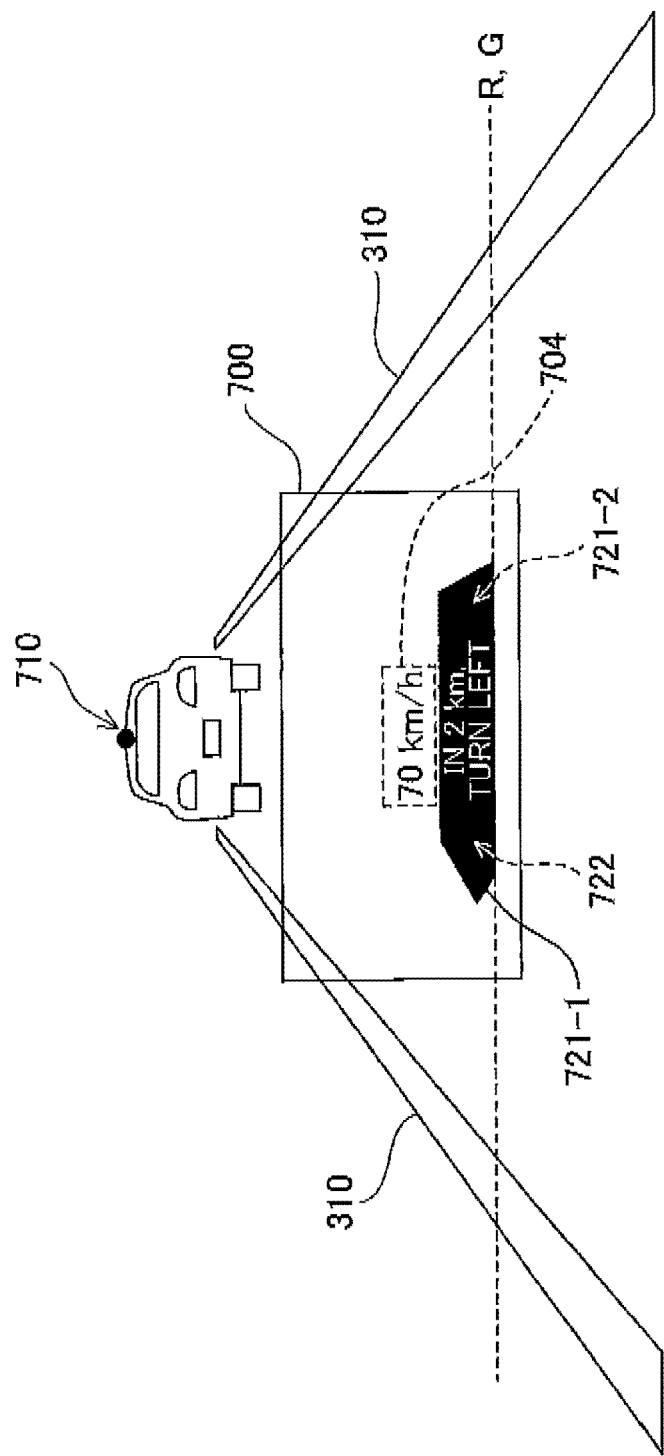

INFORMATION PROVIDING APPARATUS

CROSS-REFERENCE TO RELATED APPLICATIONS

The present application is a continuation application of International Application No. PCT/JP2017/004880, filed on Feb. 10, 2017, which claims priority to Japanese Patent Application No. 2016-029085, filed Feb. 18, 2016. The contents of these applications are incorporated herein by reference in their entirety.

BACKGROUND OF THE INVENTION

1. Field of the Invention

The disclosures discussed herein relate to an information providing apparatus.

2. Description of the Related Art

Conventionally, as an information providing apparatus, there is known in the related art an information providing apparatus which is provided in a moving body and utilizes a head-up display (HUD) device or the like for displaying an image for providing information.

Japanese Unexamined Patent Publication No. 2015-77876 discloses an information providing apparatus having a head-up display (HUD) device configured to project image light reflected by a mirror onto a windshield of a vehicle so as to display an augmented reality image (AR) near a viewing position of a driver who visually perceives a shop or the like via a windshield. In this information providing apparatus, the viewing position of the driver with respect to the shop or the like moves within the windshield with the progress of the vehicle, but display control is performed such that the display position of the AR image changes so as to follow the movement of the viewing position.

As a moving body such as a vehicle moves, the viewing position of the driver With respect to an object (shop etc.) moves (the viewing position herein indicates the position where an object existing around the moving body may be seen from the driver). In this case, even while the moving body is moving, the positional relationship between the existing object and the information providing image will be maintained by changing the display position of the information providing image such as information relating to the object by following the movement of the viewing position of the driver with respect to the object. With this method, even while the moving body is moving, the relationship between the existing object and information providing image will still be maintained, and information provided by the information providing image may be easily recognized by an occupant of the moving body. However, when the moving velocity of the moving body is high, the changing rate (moving speed) of the display position of the information providing image that follows the movement of the viewing position of the object existing around the moving body also becomes high. Therefore, when the moving velocity of the moving body is high, the viewability of the information providing image by an occupant of the moving body decreases. Note that the deterioration of visibility not only occurs in vehicles, but also in other moving bodies such as ships, aircraft, industrial robots and the like, and the objects existing around the moving body are not limited to shops and the like. Note also that the deterioration of visibility is not only experienced by drivers of moving bodies but may also be experienced by passengers of moving bodies who are not drivers.

RELATED ART DOCUMENT

Patent Document

[Patent Document 1] Japanese Unexamined Patent Publication No. 2015-77676

SUMMARY OF THE INVENTION

According to an aspect of the disclosure, an information providing apparatus includes
one or more processors; and
a memory, the memory storing instructions, which when executed by the one or more processors, cause the one or more processors to:
acquire, by a display unit, information on a predetermined position outside a moving body to display an information providing image for providing information associated with the predetermined position as a virtual image; and
control the display unit so as to change a display position of the information providing image in accordance with movement of the moving body, wherein
the display position of the information providing image is changed such that a deviation amount between the predetermined position and a straight line reaching position decreases as a distance between the moving body and the predetermined position decreases, the straight line reaching position being a position at which a straight line passing through a reference point within the moving body and the display position of the information providing image reaches a surface on which the moving body is moving.

BRIEF DESCRIPTION OF THE DRAWINGS

Other objects and further features of embodiments will be apparent from the following detailed description when read in conjunction with the accompanying drawings, in which;

FIG. 7A is a diagram (part 1) illustrating an example of an image in which a display position of a vehicle velocity display image changes as a route-specifying image and a remaining distance-to-destination image move from an upper area to a lower area within a display area, according to an embodiment;

FIG. 7B is a diagram (part 2) illustrating an example of an image in which the display position of the vehicle velocity display image changes as the route-specifying image and the remaining distance-to-destination image move from an upper area to a lower area within a display area, according to an embodiment;

FIG. 7C is a diagram (part 3) illustrating an example of an image in which the display position of the vehicle velocity display image changes as the route-specifying image and the remaining distance-to-destination image move from an upper area to a lower area within a display area, according to an embodiment;

FIG. 7D is a diagram (part 4) illustrating an example of an image in which the display position of the vehicle velocity display image changes as the route-specifying image and the remaining distance-to-destination image move from an upper area to a lower area within a display area, according to an embodiment;

FIG. 8A is a diagram (part 1) illustrating an example of an image in which a display position of a vehicle velocity display image changes as a route-specifying image and a remaining distance-to-destination image move from an upper area to a lower area within a display area, according to a related art display control technology;

FIG. 8B is a diagram (part 2) illustrating an example of an image in which a display position of a vehicle velocity display image changes as a route-specifying image and a remaining distance-to-destination image move from an upper area to a lower area within a display area, according to the related art display control technology;

FIG. 8C is a diagram (part 3) illustrating an example of an image in which a display position of a vehicle velocity display image changes as a route-specifying image and a remaining distance-to-destination image move from an upper area to a lower area within a display area, according to the related art display control technology;

FIG. 8D is a diagram (part 4) illustrating an example of an image in which a display position of a vehicle velocity display image changes as a route-specifying image and a remaining distance-to-destination image move from an upper area to a lower area within a display area, according to the related art display control technology;

DESCRIPTION OF THE EMBODIMENTS

The following illustrates an embodiment of the present invention that is applied to a driver information providing system including an automotive head-up display (HUD) device as an information providing apparatus.

Figure 1:
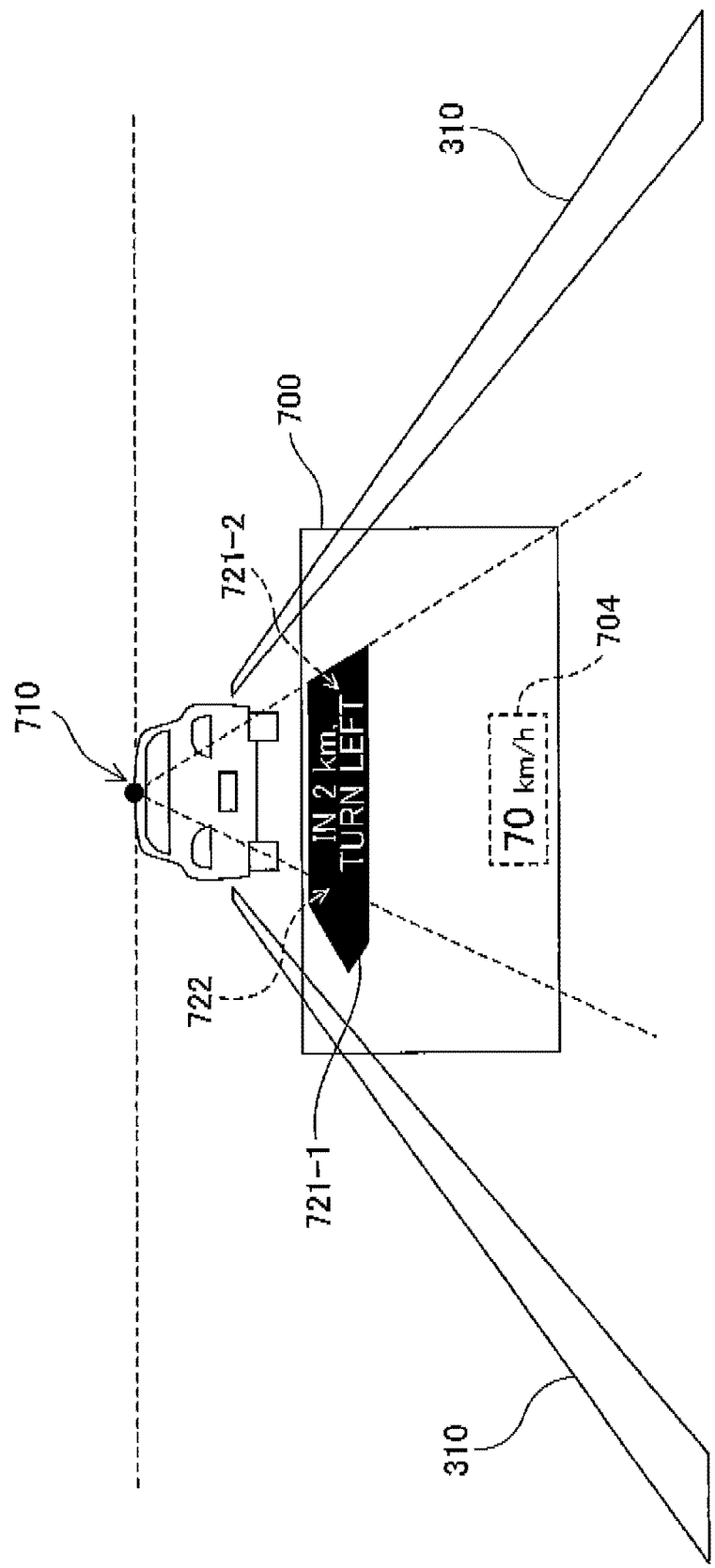
FIG. 1 is a diagram illustrating an example of a virtual image superimposed on a landscape in front of a vehicle displayed in a display area, which is viewed from a driver through a windshield, according to an embodiment.

FIG. 1 is a diagram illustrating an example of a virtual image I superimposed on a landscape in front of a reference vehicle 301 displayed in a display area 700, which is viewed from a driver 300 (an occupant) through a windshield 302.

Figure 2:
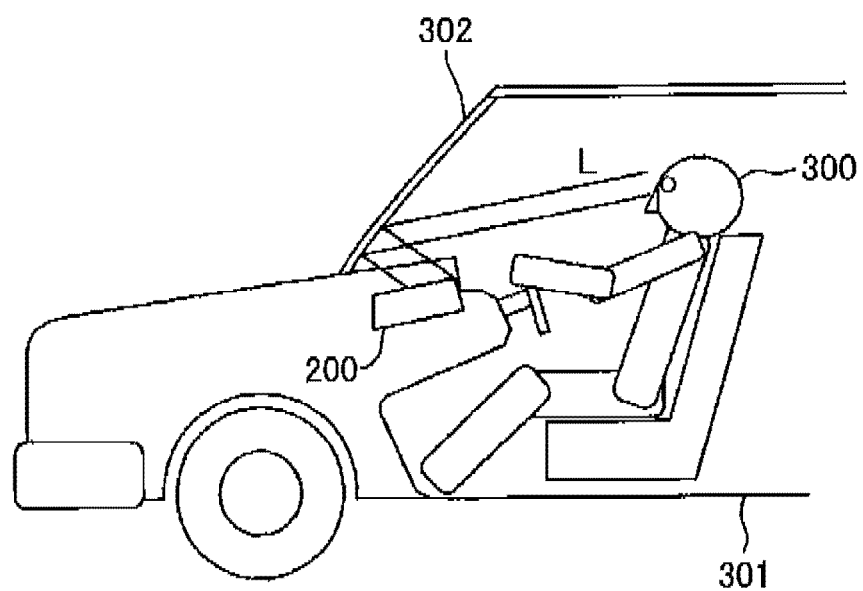
FIG. 2 is a schematic diagram schematically illustrating a configuration of an automobile equipped with an automotive HUD device, according to an embodiment.

FIG. 2 is a schematic diagram schematically illustrating a configuration of an automobile equipped with an automotive HUD device, according to an embodiment.

Figure 3:
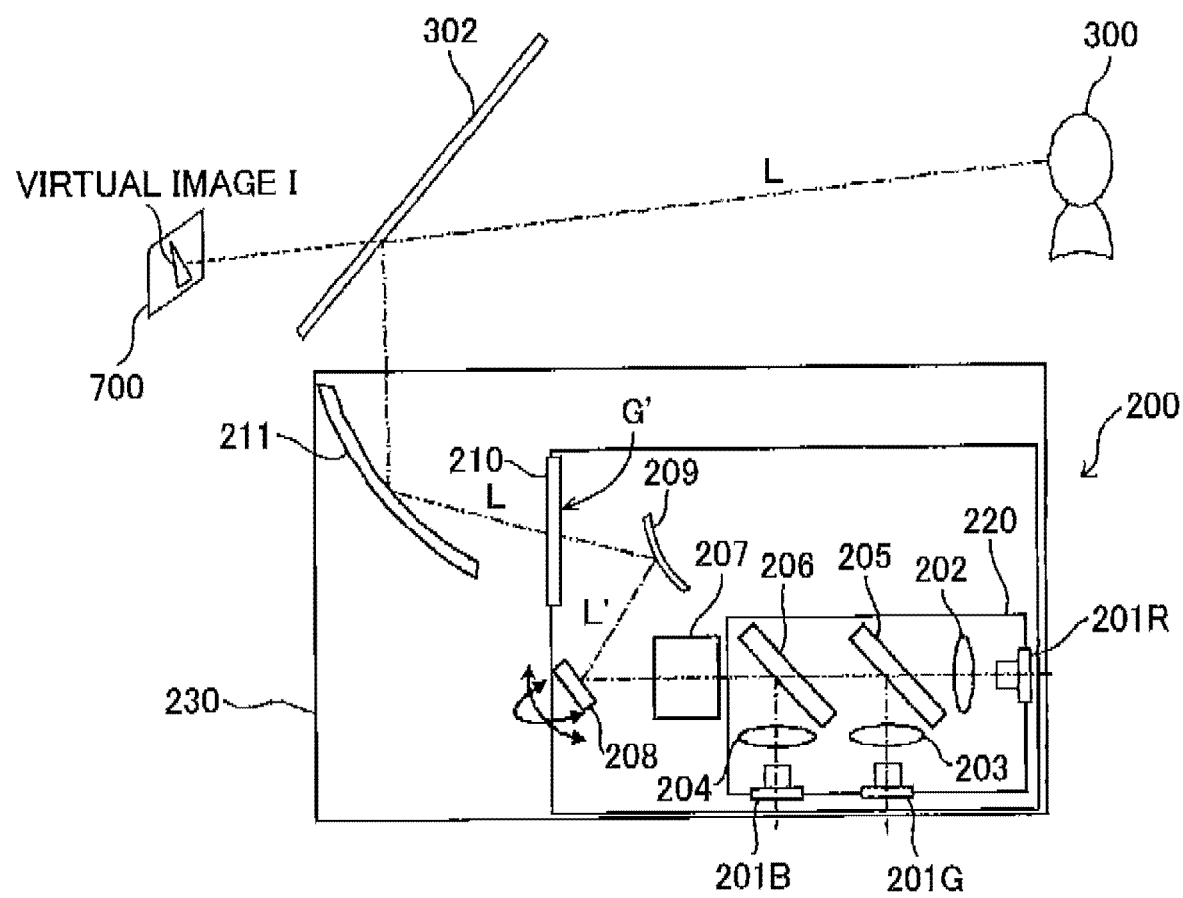
FIG. 3 is a schematic diagram schematically illustrating an internal configuration of the automotive HUD device, according to an embodiment.

FIG. 3 is a schematic diagram schematically illustrating an internal configuration of an automotive HUD device, according to an embodiment.

The automotive HUD device 200 according to a present embodiment is installed in a dashboard of the reference vehicle 301 (e.g., a traveling body as a moving body).

Projected light L, which is image light emitted from the automotive HUD device 200 within the dashboard, is reflected by the windshield 302 (e.g., a transflective member) and the reflected image light travels toward the driver 300. As a result, the driver 300 may visually perceive a HUD display image such as a later-described navigation image as a virtual image I. Note that a combiner acting as a transflective member may be provided on an inner wall surface of the windshield 302, and the virtual image I may be visually perceived by a driver through the projected light L reflected by the combiner.

Note that the driver 300 visually perceives the virtual image I from an eye box (an area around the eyes of the driver 300) on an optical path of light reflected by the windshield 302. Note that the eye box means a range in which the virtual image I may be visually perceived without adjusting a position of the driver's viewpoint. The eye box serves as a reference point for defining a later-described a "deviation amount".

In the present embodiment, an optical, system or the like of the automotive HUD device 200 is configured such that a distance from the driver 300 to the virtual image I (a distance from the eye box to the virtual image I) is 4 m or more. In a conventional general automotive HUD device, the distance from the driver 300 to the virtual image I is approximately 2 m. In general, the driver 300 is gazing of a point of infinity ahead of the reference vehicle or gazing of a preceding vehicle several tens of meters ahead of the reference vehicle. When the driver 300 focusing on such a distance attempts to view the virtual image I presented 2 m ahead, the focal lengths greatly will differ, requiring substantial movement of the crystalline lens of the eyeball. Accordingly, a focus adjustment time for a driver to focus on the virtual image I increases, and a longer time may be required for the driver to perceive a content of the virtual image I, making the eyeball of the driver 300 susceptible to be fatigued. In addition, a driver is less likely to notice a content of the virtual image I, making it difficult to appropriately provide information to the driver via the virtual image I.

According to the present embodiment, in a case where the distance to the virtual image I is 4 m or more, the movement of the crystalline lens of the eyeballs will be largely reduced, compared to a case with the conventional automotive HUD device; hence, the focus adjustment time for a driver to focus on the virtual image I is shortened, enabling the driver 300 to visually perceive the content of the virtual image I quickly and to reduce fatigue of the eyeballs of the driver. Furthermore, according to the present embodiment, a driver will be more likely to notice the content of the virtual image I, making it easier to appropriately provide information to the driver through the virtual image I.

The automotive HUD device 200 includes, within the HUD main body 230, red, green and blue laser light sources 201R, 201G and 201B, collimator lenses 202, 203 and 204 provided for the respective laser light sources 201R, 201G and 201B, two dichroic mirrors 205 and 206, a light quantity adjusting unit 207, an optical scanning device 208 as an optical scanner, a free-form surface mirror 209, a microlens array 210 as a light diverging member, and a projection mirror 211 as an optical reflection member. A light source unit 220 according to the present embodiment includes the laser light sources 201R, 201G and 201B, the collimator lenses 202, 203 and 204, and the dichroic mirrors 205 and 206 that are unitized by an optical housing.

As the laser light sources 201R, 201G and 201B, an LD (semiconductor laser element) may be used. The wavelength of a luminous flux emitted from the red laser light source 201R is, for example, 640 nm, the wavelength of luminous flux emitted from the green laser light source 201G is, for example, 530 nm, and the wavelength of a luminous flux emitted from the blue laser light source 201B is, for example, 445 nm.

The automotive HUD device 200 according to the present embodiment projects an intermediate image formed on a microlens array 210 onto the windshield 302 of the reference vehicle 301, allowing the driver 300 to visually perceive an enlarged image of the intermediate image as a virtual image I. The color laser beams emitted from the laser light sources 201R, 201G and 201B form substantially collimated light by the collimator lenses 202, 203 and 204, respectively, which are synthesized by the two dichroic mirrors 205 and 206. The light quantity of the synthesized laser beam is adjusted by the light quantity adjusting unit 207, and the synthesized laser beam is then two-dimensionally scanned by a mirror of the optical scanning device 208. Further, scan light L' two-dimensionally scanned by the optical scanning device 208 is reflected by the free-form surface mirror 209 and corrected for distortion, which is then focused on the microlens array 210 to render an intermediate image.

Note that in the present embodiment, the microlens array 210 is used as a light diverging member that individually diverges and emits the luminous flux for each pixel of the intermediate image (one point of the intermediate image); however, other light diverging members may be used in place of the microlens array 210. In addition, an intermediate image G' may be formed by using a liquid crystal display (LCD) or a fluorescent display tube (VFD).

Note that in order to display a large virtual image I with high luminance, the laser scanning method may be preferable as in this embodiment.

Furthermore, in the method using a liquid crystal display (LCD), a fluorescent display tube (VFD), or the like, slight light may also be emitted to a non-image portion within the display area, where the virtual image I is displayed; it may be difficult to completely block such light. Thus, viewability of a landscape in front of the reference vehicle 301 through the non-image portion may be poor. However, according to the laser scanning method as illustrated in this embodiment, with respect to the non-image portion within the display area of the virtual image I, light to be applied to the non-image portion will be completely blocked by turning off the laser light sources 201R, 201G and 201B. Thus, the viewability of a landscape in front of the reference vehicle 301 through the non-image portion may be prevented from lowering, which is caused by light emitted from the automotive HUD device 200, and to provide high viewability of the landscape (front landscape) in front of the reference vehicle.

Further, it is also preferable to use the laser scanning method in the case where display control is performed to partially increase luminance in a part of an image in the display area 700. In a system using a liquid crystal display (LCD), a fluorescent display tube (VFD), or the like, luminance also increases for other parts of the image displayed in the display area 700 other than the partially increased luminance part of the image displayed in the display area 700, which will result in result in no difference in luminance between the part of the image and the other parts of the image, within the display area 700.

The optical scanning device 208 tilts the mirror in a main scanning direction and a sub scanning direction by a known actuator driving system such as MEMS (Micro Electro Mechanical Systems) and performs two-dimensional scanning (raster scanning) of the laser light incident on the mirror. Drive control of the mirror is performed in synchronization with light emission timing of the laser light sources 201R, 201G and 201B. The optical scanning device 208 is not limited to the configuration according to the present embodiment, but may be configured by a mirror system having two mirrors that rotate around or oscillate from two mutually orthogonal axes, for example.

Figure 4:
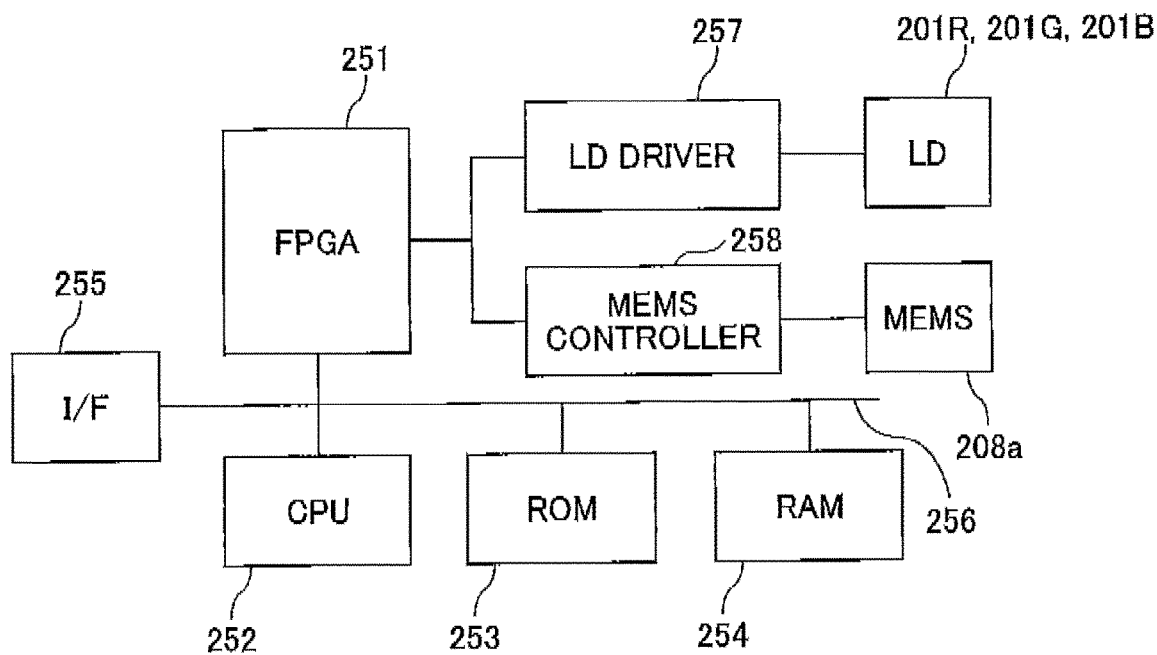
FIG. 4 is a hardware block diagram of a control system in the automotive HUD device, according to an embodiment.

FIG. 4 is a hardware block diagram of a control system in the automotive HUD device 200, according to the present embodiment. As illustrated in FIG. 2, the control system of the automotive HUD device 200 includes an FPGA 251, a central processing unit (CPU) 252, a read-only memory (ROM) 253, a random access memory (RAM) 254, an interface (I/F) 255, a bus line 256, a laser diode (LD) driver 257 and a MEMS controller 258. The FPGA 251 controls operations of the laser light sources 201R, 201G and 201B of the light source unit 220 by the LD driver 257, and controls an operation of a MEMS 208a of the optical scanning device 208 by the MEMS controller 258. The CPU 252 controls each function of the automotive HUD device 200. The ROM 253 stores an image processing program, which is executed by the CPU 252 for controlling each function of the automotive HUD device 200. The RAM 254 is used as a work area of the CPU 252. The I/F 255 is an interface for communicating with an external controller or the like, and is connected to, for example, a vehicle navigation device 400, a sensor device 500, and the like described later via a CAN (Controller Area Network) of the reference vehicle 301.

Figure 5:
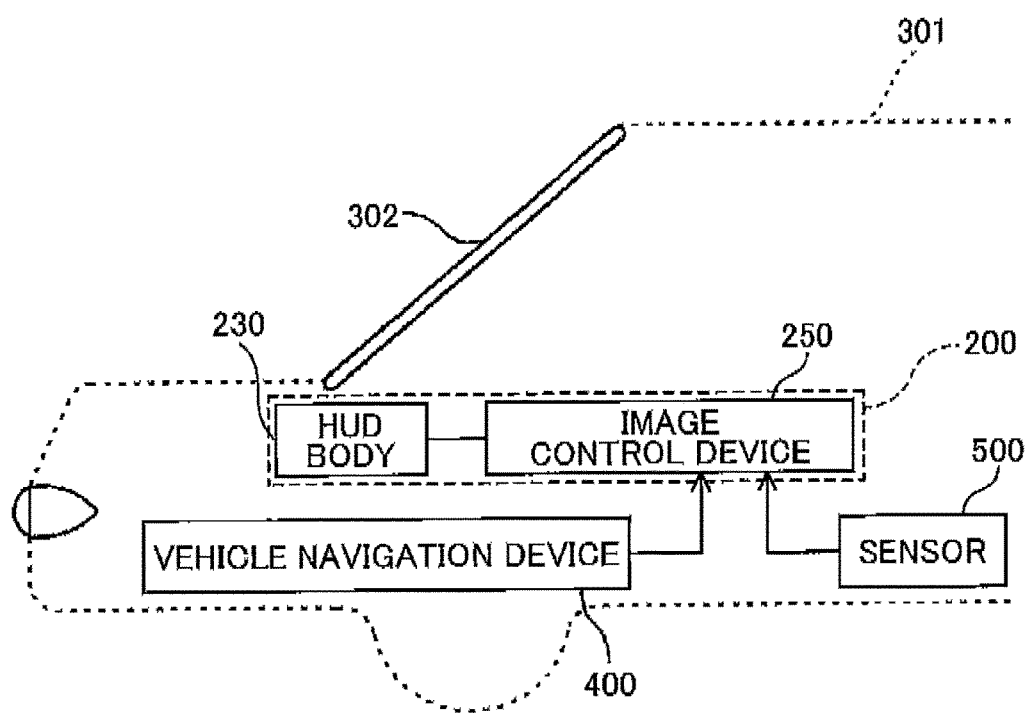
FIG. 5 is a block diagram illustrating a schematic configuration of a driver information providing system, according to an embodiment.

FIG. 5 is a block diagram illustrating a schematic configuration of a driver information providing system according to the present embodiment.

In the present embodiment, a vehicle navigation device 400, a sensor device 500, and the like are provided as an information acquisition unit configured to acquire driver-provided information provided to the driver through the virtual image I. The automotive HUD device 200 according to the present embodiment mainly includes a HUD main body 230 as an image light projection unit, and an image control device 250 as a display controller. The information acquisition unit in the present embodiment is mounted on the reference vehicle 301; however, the information acquisition unit may be installed outside the reference vehicle 301, and configured to input information acquired by the information acquisition unit via the communication unit.

The vehicle navigation device 400 according to the present embodiment may widely employ a known vehicle navigation device mounted on an automobile or the like. Information necessary for generating a route navigation image to be displayed as a virtual image I is output from the vehicle navigation device 400, which is then input to the image control device 250. The route navigation image may, for example, include an image indicating information such as a distance to a point where the reference vehicle 301 needs to change a route to destination (right turn, left turn, branching, etc.), a direction for the next change of the route, and the like. These pieces of information are input from the vehicle navigation device 400 to the image control device 250, which enables, under the control of the image control device 250 the automotive HUD device 200 to display navigation images such as route-specifying images 721-1 and 721-2 and a remaining distance-to-destination image 722 as a virtual image of information providing images in an upper area of the display area 700, as illustrated in FIG. 1.

The sensor device 500 according to the present embodiment includes one or more sensors for detecting various information indicating behaviors of the reference vehicle 301, the status of the reference vehicle 301, a situation around the reference vehicle 301, and the like. Sensing information necessary for generating an image to be displayed as a virtual image I is output from the sensor device 500, which is then input to the image control device 250. For example, vehicle velocity information included in the CAN information of the reference vehicle 301 is input from the sensor device 500 to the image control device 250, which enables, under the control of the image control device 250, the automotive HUD device 200 to display a vehicle velocity display image 704 indicating the vehicle velocity as d virtual image of information providing images in a lower area of the display area 700, as illustrated in FIG. 1.

Examples of a sensor of the sensor device 500, in addition to a sensor for detecting the vehicle velocity of the reference vehicle 301, include a laser radar device and an imaging device that detects a distance to other vehicles, pedestrians, buildings (guardrails, utility poles, etc.) existing around the reference vehicle 301 (front, side, rear), a sensor for detecting external environmental information (outside air temperatures, brightness, weather, etc.) of the reference vehicle, a sensor for detecting the driving operation (brake scanning, accelerator opening/closing degree, etc.) of the driver 300, a sensor for detecting the remaining amount of fuel in the fuel tank of the reference vehicle 301, a sensor for detecting conditions of various in-vehicle devices such as engines and batteries, and the like. Such information is detected by the sensor device 500 and is sent to the image control device 250 such that the information may be displayed by the automotive HUD device 200 as a virtual image I, which is provided to the driver 300.

Figure 6:
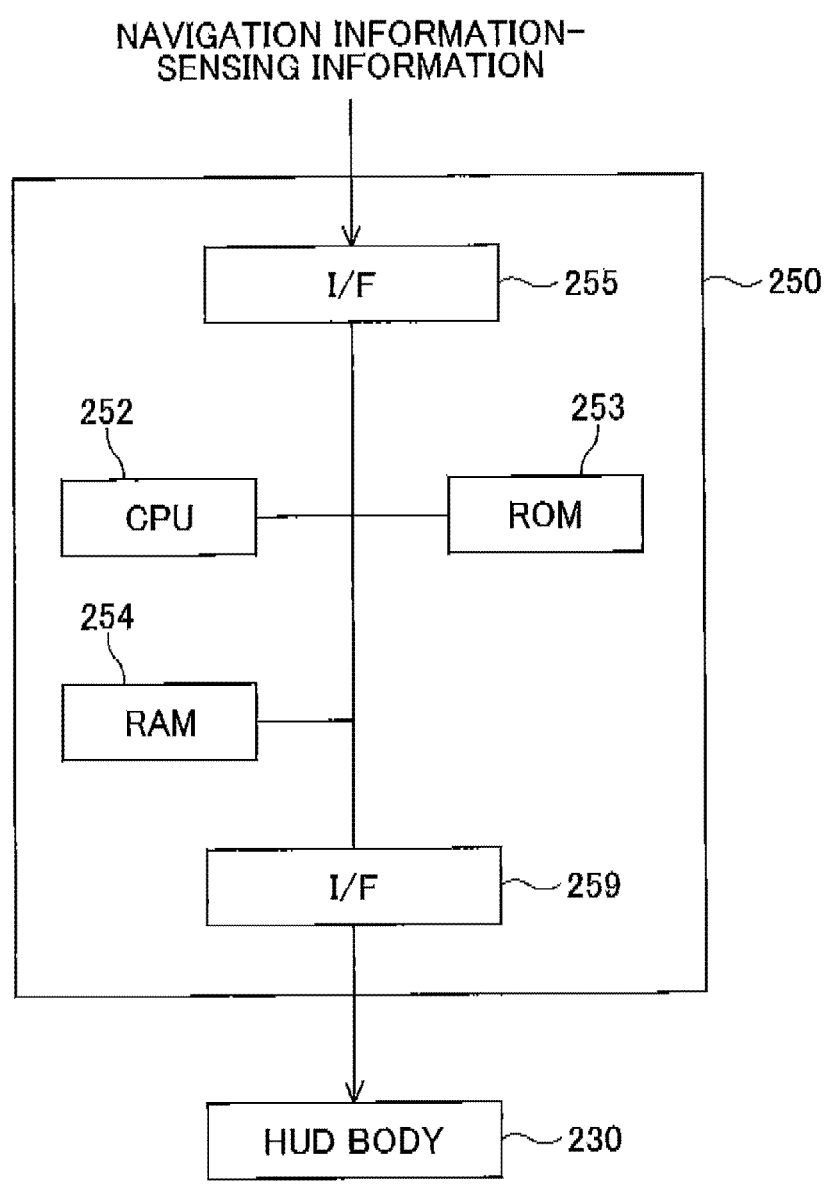
FIG. 6 is a hardware block diagram illustrating main hardware of an image control device in the automotive HUD device, according to an embodiment.

FIG. 6 is a hardware block diagram illustrating main hardware of the image control device 250.

In the image control device 250, the CPU 252, the RAM 254, the ROM 253, the input I/F 255, and the output I/F 259 are connected to one another by a data bus line. Sensing information output from the sensor device 500, navigation information output from the vehicle navigation device 400, and the like are input to the I/F 255. A control signal or the like of the HUD main body 230 is output from the I/F 259. The CPU 252 executes various computer programs such as an information providing control program stored in the ROM 253 or the like, and causes the image control device 250 to perform later-described various types of control and various processes.

Next, an illustration is given of display control of information providing images displayed as a virtual image I by the automotive HUD device 200.

In the automotive HUD device 200 according to the present embodiment, information provided to a driver through the virtual image I may be any information insofar as the information provided is useful information for a driver. Such information provided to a driver may be roughly divided into passive information and active information. The passive information is information to be provided to a driver at the timing set in the automotive HUD device 200. An example of passive information may include information having a certain relationship between the timing at which the information is provided and a content of the information. The active information is information provided to a driver simply at the timing desired by the driver. An example of the active information may include information having a low or no relationship between the timing at which the information is provided and the content of the information.

Specific examples of passive information include information related to safety during driving, route navigation information, and the like. Examples of information related to safety during driving include inter-vehicle distance information between the reference vehicle 301 and a preceding vehicle, and information with urgency relating to driving (e.g., warning information such as emergency operation instruction information for instructing a driver an emergency operation or attention calling information). Further, the route navigation information is information for guiding a driver a traveling route to a preset destination which is provided to a driver by a known vehicle navigation device. Examples of the route navigation information include traveling lane instructing information for instructing a driver to travel in a traveling lane at the nearest intersection and route changing operation instructing information for instructing a driver to perform a route change operation at the intersection or branch point at which the route should be changed from the straight traveling direction, or the like. Specifically, as the route change operation instruction information, routing information (route-specifying images 721-1 and 721-2) for designating a route to be taken at the intersection or the like, a remaining distance-to-destination information (a remaining distance-to-destination image 722) up to the intersection and the like at which the route change operation is performed, name information of the intersection, and the like may be given as examples.

The active information mainly includes information acquired by a driver at the timing desired by the driver, which thus continues to be displayed constantly or for a certain period of time. Examples of the active information include specific information of a road on which the reference vehicle 301 is traveling, the vehicle velocity information (vehicle velocity display image 704) of the reference vehicle 301, the current time information, and the like may be given. Examples of the specific information of the road (road-specific information) include road name information, restriction content information of the road such as the speed limit or no-passing, and information useful for a driver as information related to the road.

According to the present embodiment, the passive information and active information roughly classified as described above are displayed in corresponding display areas within the display area 700 in which a virtual image I (information providing image) is displayed. More specifically, according to the present embodiment, the display area 700 is divided into two display areas in a vertical direction; a passive information image mainly corresponding to the passive information is displayed in the upper area of the display area 700, and an active information image mainly corresponding to the active information is displayed in the lower area of the display area 700.

FIG. 7A to 7C are diagrams each illustrating an example of an image in which the display positions of the route-specifying images 721-1 and 721-2 and the remaining distance-to-destination image 722 change from the upper area to the lower area within the display area 700. The route-specifying images 7211 and 721-2 indicate designation information for designating a route to destination that should be taken at the next intersection or the like. The display positions of the route-specifying images 721-1 and 721-2 and the remaining distance-to-destination image 722 in the present embodiment are displayed so as to be superimposed on the road surface visually perceived by the driver 300 via the windshield 302, which is performed by the automotive HUD device 200 under the control of the image control device 250.

In order to display such route-specifying images 721-1 and 721-2 and the remaining distance-to-destination image 722, according to the related art display control technology, the route-specifying images 721-1 and 721-2 and the remaining distance-to-destination image 722 are superimposed at a point on the road surface (remaining distance-to-destination point) where a distance to the intersection and the like, at which the route change operation indicated by the route-specifying images 721-1 and 721-2, matches the remaining distance-to-destination image 722 (i.e., the remaining distance to the intersection etc.). Therefore, in the related art display control technology, as illustrated in FIGS. 8A to 8B, the route-specifying images 721-1 and 721-2 and the remaining distance-to-destination image 722 will not be displayed within the display area 700 until the viewing position of the remaining distance-to-destination point enters the display area 700. Then, when the viewing position of the remaining distance-to-destination point enters the display area 700, the display position of the route-specifying images 721-1 and 721-2 and the remaining distance-to-destination image 722 moves downward at the same rate as the moving rate at which the viewing position of the remaining distance-to-destination point moves downward within the display area 700, as illustrated in FIGS. 8C and 8D.

According to such a related art display control technology, the positional relationship between the viewing position of the remaining distance-to-destination point and the display positions of the route-specifying images 721-1 and 721-2 and the remaining distance-to-destination image 722 is maintained while the remaining distance-to-destination point on the road surface moves within the display area 700 as the reference vehicle 301 moves. Therefore, from this positional relationship, the driver 300 recognizes the relationship between the remaining distance-to-destination point and the information provided by the route-specifying images 721-1 and 721-2 and the remaining distance-to-destination image 722, and easily understands content of the operation instruction (which intersection or the like at which the driver should turn left) provided by the route-specifying images 721-1 and 721-2 and the remaining distance-to-destination image 722.

However, when the vehicle velocity of the reference vehicle 301 increases, the moving rate at which the viewing position of the remaining distance-to-destination point on the road surface moves within the display area 700 will increase. As a result, according to the related art display control technology, when the display positions of the route-specifying images 721-1 and 721-2 and the remaining distance-to-destination image 722 are changed at the same rate as the moving rate at which the viewing position of the remaining distance-to-destination point on the road surface moves, the changing rate of this display position also increases. Hence, when the vehicle velocity of the reference vehicle 301 is high, the changing rates of the display positions of the route-specifying images 721-1 and 721-2 and the remaining distance-to-destination image 722 are too high, which lowers the driver's viewability of these images.

Further, there are cases where, after the viewing position of the remaining distance-to-destination point on the road surface has moved out of the display area 700, display control is performed such that the route-specifying images 721-1 and 721-2 and the remaining distance-to-destination image 722 are not displayed (stopped being displayed) along with the viewing position of the remaining distance-to-destination point moving out of the display area 700. In this case, the relationship between the remaining distance-to-destination point and the information provided by the route-specifying images 721-1 and 721-2 and the remaining distance-to-destination image 722 is increased; however, when the vehicle velocity of the reference vehicle 301 is high, the time for which the route-specifying images 721-1 and 721-2 and the remaining distance-to-destination image 722 are displayed in the display area 700 will be short. Accordingly, display of the route-specifying images 721-1 and 721-2 and the remaining distance-to-destination image 722 may be stopped before the driver visually perceives the route-specifying images 721-1 and 721-2 and the remaining distance-to-destination image 722; thus, the driver may have risks of not receiving the information provided by these images (i.e., the route-specifying images 721-1 and 721-2 and the remaining distance-to-destination image 722).

In particular, due to the demand for downsizing of the automotive HUD device, there are restrictions on enlarging the size of the display area 700. Hence, the display area 700 may have to be relatively small in some cases. In a case where display of the route-specifying images 721-1 and 721-2 and the remaining distance-to-destination image 722 is stopped as the viewing position of the remaining distance-to-destination point on the road surface has moved out from the display area 700, the time for which the route-specifying images 721-1 and 721-2 and the remaining distance-to-destination image 722 are displayed in the display area 700 decreases as the size (vertical length) of the display area 700 decreases. Accordingly, in the automotive HUD device having a small display area 700, especially when the vehicle velocity of the reference vehicle 301 is high, the time for which the route-specifying images 721-1 and 721-2 and the remaining distance-to-destination image 722 are displayed in the display area 700 decreases. As a result, the driver and the like may be more likely to fail to receive information provided by these images (i.e., the route-specifying images 721-1 and 721-2 and the remaining distance-to-destination image 722).

According to the present embodiment, as illustrated in FIG. 7D, even after the viewing position of the remaining distance-to-destination point on the road surface has moved out of the display area 700, the route-specifying images 721-1 and 721-2 and the remaining distance-to-destination image 722 are continuously displayed in the lower area of the display area 700 for a predetermined period, as illustrated in FIG. 7D. Thus, according to the present embodiment, it is possible to avoid a situation where display of the route-specifying images 721-1 and 721-2 and the remaining distance-to-destination image 722 is stopped before the driver visually perceives the route-specifying images 721-1 and 721-2 and the remaining distance-to-destination image 722 such that the driver fails to receive the information provided by these images (i.e., the route-specifying images 721-1 and 721-2 and the remaining distance-to-destination image 722). However, when the display positions of the route-specifying images 721-1 and 721-2 and the remaining distance-to-destination image 722 are changed at the same rate as the moving rate at which the viewing position of the remaining distance-to-destination point on the road surface moves, and the vehicle velocity of the reference vehicle 301 is high, the changing rates of the display positions of the route-specifying images 721-1 and 721-2 and the remaining distance-to-destination image 722 become too high; hence, it is not possible to prevent the viewability of the route-specifying images 721-1 and 721-2 and the remaining distance-to-destination image 722 from lowering during changing of the display position.

Thus, according to the present embodiment, the image control device 250 performs display control such that the display positions of the route-specifying images 721-1 and 721-2 and the remaining distance-to-destination image 722 are changed at a rate lower than the moving rate at which the viewing position of the remaining distance-to-destination point on the road surface moves within the display area 700. Accordingly, as illustrated in FIGS. 7C and 7D, compared to the related art display control technology in which the display positions of the route-specifying images 721-1 and 721-2 and the remaining distance-to-destination image 722 are changed at the same rate as the moving rate at which the viewing position of the remaining distance-to-destination point on the road surface moves, the changing rates of the display positions of the route-specifying images 721-1 and 721-2 and the remaining distance-to-destination image 722 may be reduced. Thus, it is possible to prevent the viewability by the driver 300 from deteriorating.

Further, in the present embodiment, at an initial stage when the route-specifying images 721-1 and 721-2 and the remaining distance-to-destination image 722 are displayed, the display position (G) of the route-specifying images 721-1 and 721-2 and the remaining distance-to-destination image 722 deviates from the viewing position (R) of the remaining distance-to-destination point. Thereafter, the viewing position of the remaining distance-to-destination point on the road surface moves downward so as to follow the route-specifying images 721-1 and 721-2 and the remaining distance-to-destination image 722 whose display positions change downward. As a result, as illustrated in FIGS. 7B and 7C, the deviation between the display positions of the route-specifying images 721-1 and 721-2 and the remaining distance-to-destination image 722 and the viewing position of the remaining distance-to-destination point on the road surface gradually decreases.

As described above, in the present embodiment, the positional relationship between the viewing position of the remaining distance-to-destination point and the display positions of the route-specifying images 721-1 and 721-2 and the remaining distance-to-destination image 722 are offset. Thus, the related art display control technology having no offset in the positional relationship may enhance the relationship between the remaining distance-to-destination point and the information provided by the route-specifying images 721-1 and 721-2 and the remaining distance-to-destination image 722. However, in the present embodiment, the direction of movement of the viewing position of the remaining distance-to-destination point matches the direction of change (movement) of the display positions of the route-specifying images 721-1 and 721-2 and the remaining distance-to-destination image 722. Thus, the viewing position of the remaining distance-to-destination point and the display positions of the route-specifying images 721-1 and 721-2 and the remaining distance-to-destination image 722 move in the same direction. Therefore, even when there is some offset in the positional relationship between the viewing position of the remaining distance-to-destination point and the display positions of the route-specifying images 721-1 and 721-2 and the remaining distance-to-destination image 722, a sufficient relationship may be obtained.

Further, in the present embodiment, as the remaining distance-to-destination point on the road surface approaches the reference vehicle 301, the deviation between the viewing position of the remaining distance-to-destination point and the display positions of the route-specifying images 721-1 and 721-2 and the remaining distance-to-destination image 722 decreases. In general, the importance of causing a driver to recognize the provided information relating to the remaining distance-to-destination point is often low as the remaining distance-to-destination point on the road surface with respect to the reference vehicle 301 increases. Hence, there is no particular disadvantage in providing information even when there is a large deviation between the viewing position of the remaining distance-to-destination point and the display positions of the route-specifying images 721-1 and 721-2 and the remaining distance-to-destination image 722 at the time where the remaining distance-to-destination point on the road surface is away from the reference vehicle 301. Rather, as in the present embodiment, it is beneficial for information providing to increase the viewability by the driver 300 by lowering the changing rates of the display positions of the route-specifying images 721-1 and 721-2 and the remaining distance-to-destination image 722.

Furthermore, in the present embodiment, the route-specifying images 721-1 and 721-2 and the remaining distance-to-destination image 722 start to be displayed within the display area 700 before the remaining distance-to-destination point on the road surface moves into the display area 700. Thus, it is possible to obtain a longer display time for displaying the route-specifying images 721-1 and 721-2 and the remaining distance-to-destination image 722, compared to a case where the route-specifying images 721-1 and 721-2 and the remaining distance-to-destination image 722 start to be displayed within the display area 700 when or after the remaining distance-to-destination point on the road surface moves into the display area 700. Thus, according to the present embodiment, it is possible to further avoid a situation where a driver fails to visually perceive the route-specifying images 721-1 and 721-2 and the remaining distance-to-destination image 722 so as not to receive the information provided by these images.

An example of specific display control according to the present embodiment is noted as follows. First, the image control device 250 calculates a viewing position at which the remaining distance-to-destination point on the road surface corresponding to the route-specifying images 721-1 and 721-2 and the remaining distance-to-destination image 722 are visually perceived by the driver, based on navigation information input from the vehicle navigation device 400, sensing information input from the sensor device 500, setting position information of the display area 700 for the virtual image I to be displayed by the automotive HUD device 200, viewpoint position information of the driver, and the like. Note that the viewpoint position information of the driver may be fixed information indicating the position of the head or the eyes of a standard driver. Alternatively, the actual position of the head or the eyes of a driver is detected by a detection device (imaging unit or the like) and information indicating the viewpoint position of the driver obtained based on the detection result may be used as the viewpoint position information of the driver.

Next, the image control device 250 determines the display positions of the route-specifying images 721-1 and 721-2 and the remaining distance-to-destination image 722 based on the viewing position of the remaining distance-to-destination point calculated in this manner. Specifically, until the display positions of the route-specifying images 721-1 and 721-2 and the remaining distance-to-destination image 722 reach a predetermined position such as the lower area of the display area 700, the image control device 250 determines the display positions of the route-specifying images 721-1 and 721-2 and the remaining distance-to-destination image 722 such that the display positions of the route-specifying images 721-1 and 721-2 and the remaining distance-to-destination image 722 are constantly positioned lower than the viewing position of the remaining distance-to-destination point on the road surface, and such that the deviation between these display positions and the viewing position of the remaining distance-to-destination point gradually decreases as the display positions of the route-specifying images 721-1 and 721-2 and the remaining distance-to-destination image 722 change downward. In other words, until a distance between the remaining distance-to-destination point on the road surface and the reference vehicle 301 becomes a predetermined distance or less, the image control device 250 determines the display positions of the route-specifying images 721-1 and 721-2 and the remaining distance-to-destination image 722 such that a point (image corresponding point) on the road surface on which the display positions of the route-specifying images 721-1 and 721-2 and the remaining distance-to-destination image 722 are superimposed is constantly located closer to the reference vehicle 301 than is the remaining distance-to-destination point on the road surface, and such that the distance between the image corresponding point and the remaining distance-to-destination point gradually decreases as the remaining distance-to-destination point on the road surface approaches the reference vehicle 301.

Figure 9:
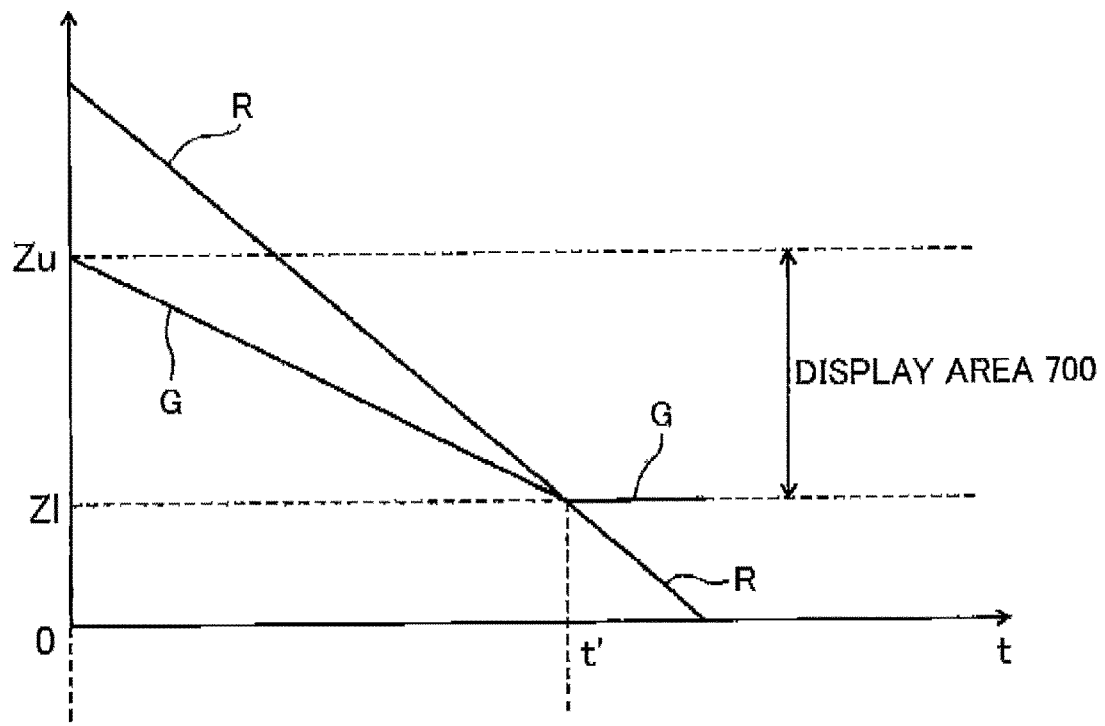
FIG. 9 is a graph illustrating a time-dependent change between a remaining distance-to-destination point on the road surface and a point (image corresponding point) on the road surface on which the display positions of the route-specifying images 721-1 and 721-2 and the remaining distance-to-destination image 722 are superimposed, according to an embodiment.

FIG. 9 is a graph illustrating a time-dependent change between a remaining distance-to-destination point on the road surface and a point (image corresponding point) on the road surface on which the display positions of the route-specifying images 721-1 and 721-2 and the remaining distance-to-destination image 722 are superimposed. This graph is obtained when the reference vehicle 301 is traveling at a constant velocity, where a vertical axis indicates a distance from the reference vehicle 301 to each (destination) point, and a horizontal axis indicates time.

Figure 10:
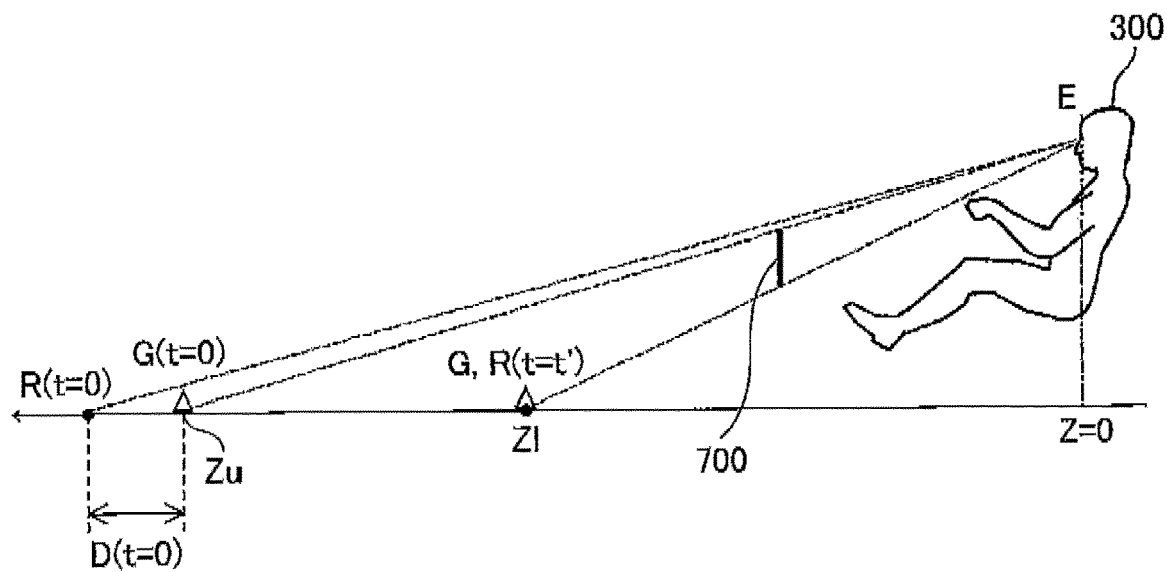
FIG. 10 is a diagram corresponding to FIG. 9, illustrating positional changes between the remaining distance-to-destination point on the road surface and an image corresponding point as viewed from a lateral direction of the reference vehicle 301 in a traveling direction.

FIG. 10 is a diagram corresponding to FIG. 9, illustrating positional changes between the remaining distance-to-destination point on the road surface and the image corresponding point as viewed from a lateral direction of the reference vehicle 301 in the traveling direction. In FIG. 10, E represents an eye box. (an area in the vicinity of the eyes of the driver 300) that serves as a reference point in the reference vehicle 301. G represents a position where a straight line passing through the reference point E and a position within the display area 700, which displays the information providing images (route-specifying images 721-1 and 721-2 and the remaining distance-to-destination image 722), reaches the road surface.

That is, G represents a position where a straight line passing through the reference point E and the position within the display area 700, which displays the information providing images, intersects the road surface. Note that the road surface is a typical example of a surface (moving body traveling surface) on which the moving body moves; however, the road surface in the present invention is not limited thereto. For example, when the moving body is a ship, the moving body traveling surface is a water surface.

Further, $t=0$ is determined as a time at which the route-specifying images 721-1 and 721-2 and the remaining distance-to-destination image 722 are first displayed, and $t=t'$ is determined as a time at which the viewing position of the remaining distance-to-destination point R passes the position (near the lower end of the display area 700) where the route-specifying images 721-1 and 721-2 and the remaining distance-to-destination image 722 are last displayed (displayed most recently).

That is, the image corresponding point G ($t=0$) indicates an image corresponding point at which the route-specifying images 721-1 and 721-2 and the remaining distance-to-destination image 722 are initially displayed near the upper end of the display area 700, and Zu indicates a distance on the road surface between the reference point E (Z=0) and the image corresponding point S (t=0).

Further, the image corresponding point G (t=t') indicates an image corresponding point immediately after the route-specifying images 721-1 and 721-2 and the remaining distance-to-destination image 722 have moved near the lower end of the display area 700, and Zl indicates a distance on the road surface between, the reference point E (Z=0) and the image corresponding point G (t=t'). D (t=0) indicates a deviation amount between the remaining distance-to-destination point R (t=0) and the image corresponding point G (t=0).

D (t=0) increases as the moving velocity of the reference vehicle 301 increases. That is, in FIG. 10, the length on the horizontal axis indicating the deviation amount D (t=0) increases as the vehicle velocity of the reference vehicle 301 increases. In other words, the higher the vehicle velocity of the reference vehicle 301, the more R (t=0) is located toward the left of the horizontal axis of FIG. 10 (the position of the point of G (t=0) remains unchanged). Similarly, in FIG. 9, a distance on the vertical axis between a point at which R intersects the vertical axis and a point at which G intersects the vertical axis increases as the vehicle velocity of the reference vehicle 301 increases.

In the example of FIG. 10, the deviation amount D (t=t') at t=t' (i.e., when the information providing image is displayed near the lower end of the display area 700) is zero.

However, even if the deviation amount D (t=t') at the time at which the information providing image is displayed near the lower end of the display area 700 is not completely zero, the deviation amount D (t=t') that is less than or equal to 1 minute of the viewing angle may be regarded as substantially zero. This is because the driver 300 recognizes the deviation amount D (t=t') being zero when the deviation amount D (t=t') is less than or equal to 1 minute of the viewing angle. Note that in FIG. 10, the viewing angle is an angle formed by a straight line connecting the reference point E and the remaining distance-to-destination point R and a straight line connecting the reference point E and the image corresponding point G.

In the present embodiment, when the straight line passing through the reference point E and the remaining distance-to-destination point R is located above the straight line passing through the reference point E and the upper end of the display area 700, the route-specifying images 721-1 and 721-2 and the remaining distance-to-destination image 722 start to be displayed. (see FIG. 10).

Further, in the present embodiment, the display positions of the route-specifying images 721-1 and 721-2 and the remaining distance-to-destination image 722 are changed from the upper end side to the lower end side of the display area 700, such that the deviation amount D decreases as the distance between the reference vehicle 301 and the remaining distance-to-destination point R decreases (i.e., as t increases).

More specifically, in the present embodiment, the display of the route-specifying images 721-1 and 721-2 and the remaining distance-to-destination image 722 are controlled such that there is a constant ratio K (K<1) of the difference (Zg−Zl) with respect to the difference (Zr−Zl). The difference (Zg−Zl) is a difference between a distance Zg to the image corresponding point G and a distance Zl to the point on the road surface corresponding to the vicinity of the lower end of the display area 700

That is, while maintaining a relation of "Zg−Zl=K×(Zr−Zl)", the display positions of the route-specifying images 721-1 and 721-2 and the remaining distance-to-destination image 722 are changed so as to follow the movement of the viewing position of the remaining distance-to-destination point R, which moves along with the travel of the reference vehicle 301.

Accordingly, display control is performed such that the changing rates of the display positions of the route-specifying images 721-1 and 721-2 and the remaining distance-to-destination image 722 are lower than the moving rate of the viewing position of the remaining distance-to-destination point R within the display area 700. As a result, the changing rates of the display positions of the route-specifying images 721-1 and 721-2 and the remaining distance-to-destination image 722 may be lowered, which may prevent deterioration in viewability by the driver 300.

In the present embodiment, the ratio K may be appropriately set within a range of 0<K<1, and timings, at which the route-specifying images 721-1 and 721-2 and the remaining distance-to-destination image 722 are first displayed, are determined in accordance with this ratio K. Further, the ratio K may be set such that the faster the vehicle velocity of the reference vehicle 301 is, the smaller the ratio K may be. Note that the vehicle velocity of the reference vehicle 301 in this case may, for example, be the vehicle velocity at any timing before the route-specifying images 721-1 and 721-2 and the remaining distance-to-destination image 722 are first displayed. This is because when the vehicle velocity of the reference vehicle 301 is high, the rate at which the remaining distance-to-destination point R passes through the display area 700 increases, and the changing rates of the display positions of the route-specifying images 721-1 and 721-2 and the remaining distance-to-destination image 722 also increase accordingly. However, the changing rates of the display positions of the route-specifying images 721-1 and 721-2 and the remaining distance-to-destination image 722 may be lowered by decreasing the ratio K.

Figure 11:
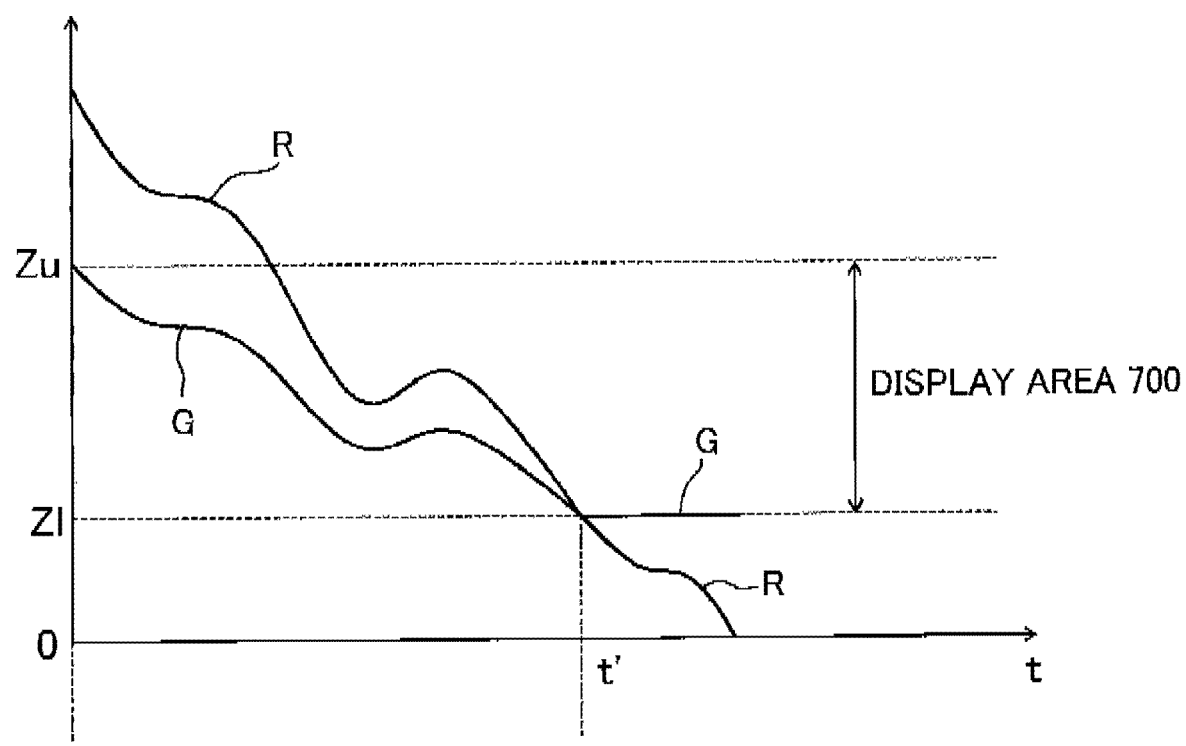
FIG. 11 is a graph illustrating a time-dependent change between a remaining distance-to-destination point on the road surface and a point (image corresponding point) on the road surface on which display positions of the route-specifying images and the remaining distance-to-destination image are superimposed, in an example where the vehicle velocity varies, according to the embodiment.

In addition, in the example of FIG. 9, the vehicle velocity is constant while the display positions of the route-specifying images 721-1 and 721-2 and the remaining distance-to-destination image 722 change; however, a graph as illustrated in FIG. 11 is obtained when the vehicle velocity during that time changes.

In the above-described present embodiment, an illustration is given of display control of the route change operation instruction information, routing information (route-specifying images 721-1 and 721-2) for designating a route to be taken at the intersection or the like, and a remaining distance-to-destination information (a remaining distance-to-destination image 722) up to the intersection and the like at which the route change operation is performed, and the like. These images do not interfere with providing information even if these images continue to be displayed for a while after the viewing position of the corresponding remaining distance-to-destination point R passes through the display area 700; rather it is beneficial in order to make the driver recognize such information. However, when these images continue to be displayed for a while after the viewing position of the corresponding remaining distance-to-destination point R passes through the display area 700, some of the images may have risks of obstructing providing of information, such as confusing the driver or causing misidentification of information.

For example, when an intersection instruction image indicating a position of an intersection at which the route to be changed continues to be displayed even after the reference vehicle 301 passes through the intersection, a driver may be confused or erroneously recognize information. Further, when an obstacle instruction image, which indicates positions of an obstacle for a driver to easily recognize various obstacles (pedestrians, utility poles etc.) existing around the reference vehicle, continues to be displayed even after the reference vehicle 301 passes through the position of the obstacle, the driver may also be confused or erroneously recognize information. Further, when information notification image for notifying a driver of information on stores existing around the reference vehicle continues to be displayed even after the reference vehicle 301 passes through the positions of the stores or the like, the driver may also be confused or erroneously recognize information.

It is preferable to stop displaying such information providing images in accordance with the timing at which the viewing position of an object such as an intersection, an obstacle, a shop or the like on the road surface corresponding to the information providing image moves out from the display area 700. The time for displaying an image (image display time) in this case is a period from the start of displaying the information providing image until the viewing position of the object exits the display area 700. As a result, when the vehicle velocity of the reference vehicle 301 is, high, the image display time is short such that that the information providing image is not displayed (stopped being displayed) before the driver views the information providing image. This indicates that the driver may have risks of failing to receive information provided by the information providing image.

FIGS. 12A to 12E are diagrams each illustrating an example of an image in which an intersection indication image 723 indicating the intersection position at which the route should be changed moves from the upper area to the lower area within the display area 700, according to the present embodiment. FIGS. 13A to 13E are diagrams each illustrating an example of an image in which an intersection indication image 723 indicating an intersection position at which the route should be changed moves from the upper area to the lower area within the display area 700, according to the related art display control technology.

Figure 13A:
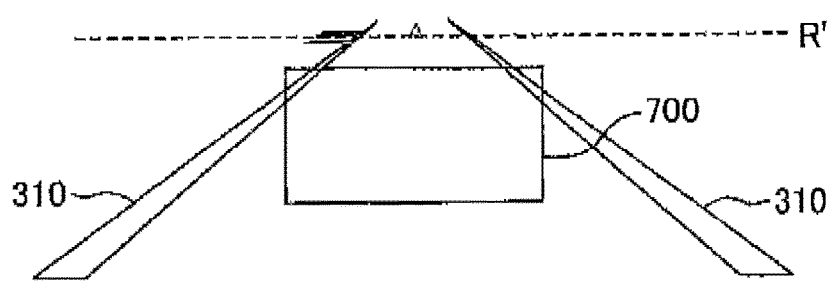
FIG. 13A is a diagram (part 1) illustrating an example of an image in which an intersection instruction image indicating an intersection position at which the route should be changed moves from an upper area to a lower area within a display area, according to the related art display control technology.
Figure 13B:
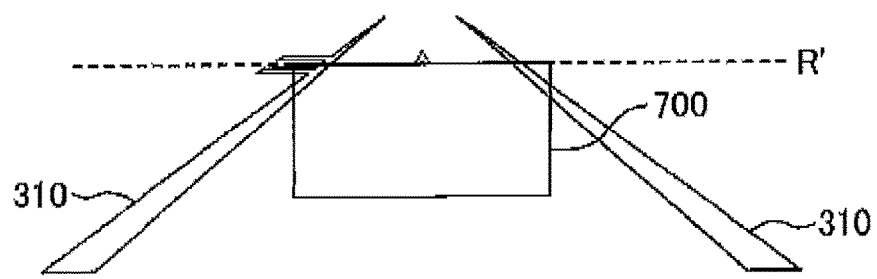
FIG. 13B is a diagram (part 2) illustrating an example of an image in which an intersection instruction image indicating an intersection position at which the route should be changed moves from an upper area to a lower area within a display area, according to the related art display control technology.
Figure 13C:
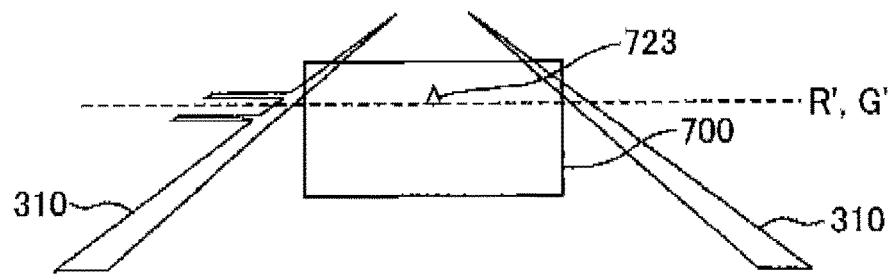
FIG. 13C is a diagram (part 3) illustrating an example of an image in which an intersection instruction image indicating en intersection position at which the route should be changed moves from an upper area to a lower area within a display area, according to the related art display control technology.
Figure 13D:
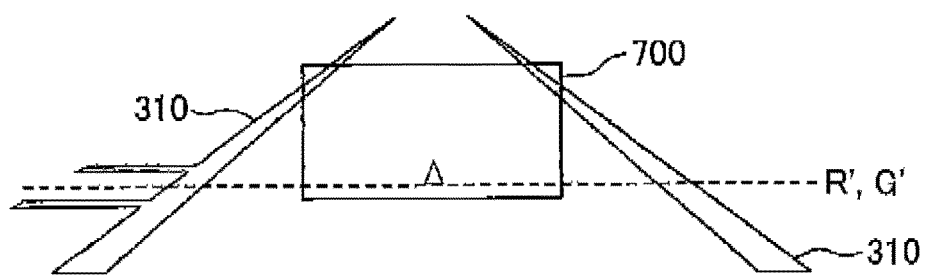
FIG. 13D is a diagram (part 4) illustrating an example of an image in which an intersection instruction image indicating an intersection position at which the route should be changed moves from an upper area to a lower area within a display area, according to the related art display control technology.
Figure 13E:
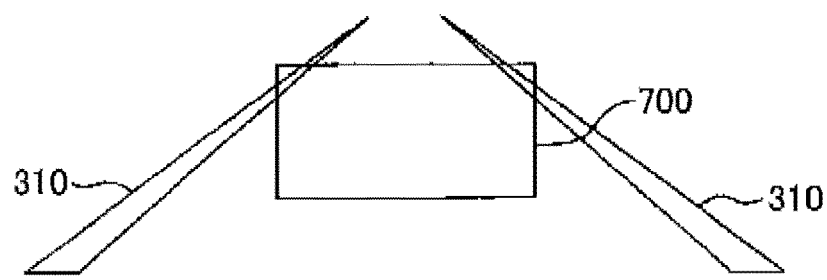
FIG. 13E is a diagram (part 5) illustrating an example of an image in which an intersection instruction image indicating an intersection position at which the route should be changed moves from an upper area to a lower area within a display area, according to the related art display control technology.

According to the related art display control technology, as illustrated in FIGS. 13A and 13B, the intersection indication image 723 is not displayed in the display area 700 until the viewing position of an intersection R' at which the route should be changed enters the display area 700. When the reference vehicle 301 approaches the intersection R' and the viewing position of the intersection R' enters the display area 700, the display position of the intersection indication image 723 is changed downward at the same rate as the moving rate at which the viewing position of the intersection R' moves downward in the display area 700, as illustrated in FIGS. 13O to 13D. Then, as illustrated in FIG. 13E, when the reference vehicle 301 passes through the intersection R' and the viewing position of the intersection R' moves out of the display area 700, the intersection indication image 723 is not displayed (stopped being displayed) in accordance with the viewing position of the intersection R' moving out of the display area 700.

In such a related art display control technology, the display time of the intersection indication image 723 is short; thus, there is a risk that the intersection indication image 723 will be stopped being displayed before the driver visually perceives the intersection indication image 723 such that the reference vehicle 301 passes through the intersection at which the route should be changed without the driver's recognizing the intersection indication image 723. Specifically, when the size (vertical length) of the display area 700 is small due to the viewpoint of demands for downsizing of the automotive HUD device, the display time of the intersection indication image 723 is further shortened. In addition, when the vehicle velocity of the reference vehicle 301 is high, the display time of the intersection indication image 723 is further shortened.

Figure 12A:
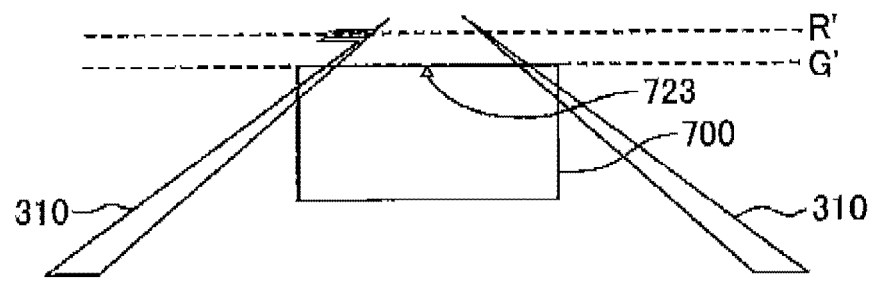
FIG. 12A is a diagram (part 1) illustrating an example of an image in which an intersection instruction image indicating an intersection position at which a route should be changed moves from an upper area to a lower area within a display area, according to an embodiment.
Figure 12B:
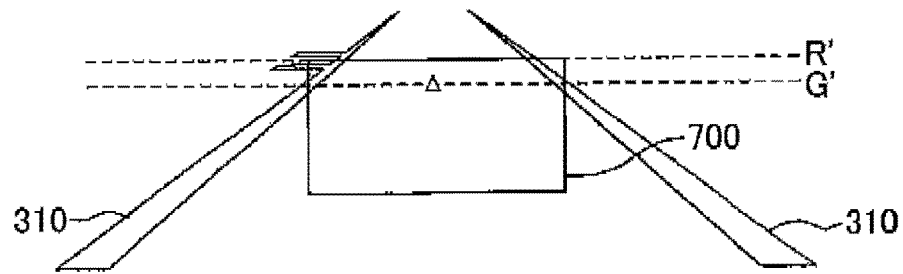
FIG. 12B is a diagram (part 2) illustrating an example of an image in which an intersection instruction image indicating an intersection position at which the route should be changed moves from the upper area to the lower area within the display area, according to an embodiment.
Figure 12C:
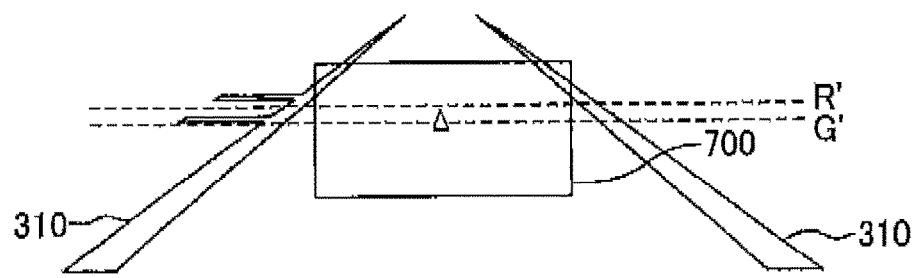
FIG. 12C is a diagram (part 3) illustrating an example of an image in which an intersection instruction image indicating an intersection position at which the route should be changed moves from the upper area to the lower area within the display area, according to an embodiment.
Figure 12D:
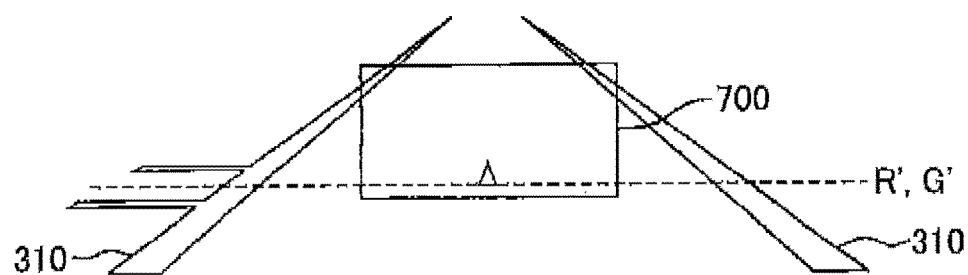
FIG. 12D is a diagram (part 4) illustrating an example of an image in which an intersection instruction image indicating an intersection position at which the route should be changed moves from the upper area to the lower area within the display area, according to an embodiment.
Figure 12E:
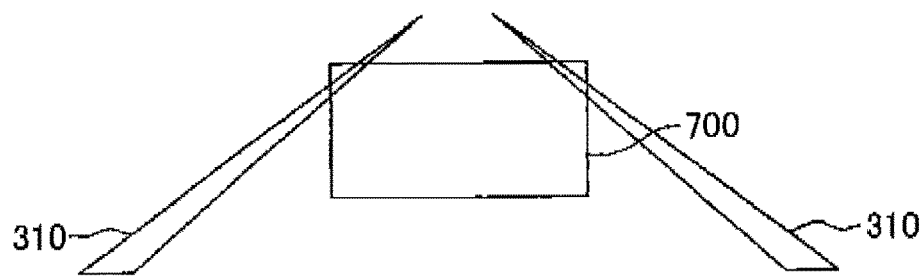
FIG. 12E is a diagram (part 5) illustrating an example of an image in which an intersection instruction image indicating an intersection position at which the route should be changed moves from the upper area to the lower area within the display area, according to an embodiment.

By contrast, according to the present embodiment, illustrated earlier, display control is performed so as to change the display position of the intersection indication image 723 at a rate lower than the moving rate at which the viewing position of the intersection R' moves within the display area 700. Specifically, as illustrated in FIG. 12A, the intersection indication image 723 is displayed in the display area 700 before the viewing position of the intersection R' at which the route should be changed enters the display area 700. Thereafter, as the reference vehicle 301 approaches the intersection R', the display position of the intersection indication image 723 is changed downward, as illustrated in FIG. 12B. Then, after the viewing position of the intersection R' enters the display area 700, the display position of the intersection indication image 723 is kept being changed downward. When the reference vehicle 301 passes through the intersection R' and the viewing position of the intersection R' moves out of the display area 700, the intersection indication image 723 is stopped being displayed in accordance with the viewing position of the intersection R' moving out of the display area 700.

According to the related art display control technology, the intersection instruction image 723 may be displayed, only during a period from the viewing position of the intersection R' entering into the display area 700 to the viewing position of the intersection R' moving out of the display area 700. However, according to the present embodiment, it is possible to display the intersection indication image 723 for a longer time. Therefore, even when the size of the display area 700 is small, or even when the vehicle velocity of the reference vehicle 301 is high, the display time of the intersection indication image 723 may be gained, which will prevent the driver from overlooking information providing images.

Further, according to the above-described embodiment, an illustration is given of examples of display control of the information providing images such as the route-specifying images 721-1 and 721-2 and the remaining distance-to-destination image 722, or the intersection instruction image 723; however, the display control is not limited to these examples of display control performed on the information providing images.

For example, display control may be performed on information providing images in association with the position of a certain area (e.g., a road) such as information on the road on which the reference vehicle 301 is traveling (e.g., road name information, and restriction content information of the road such as the speed limit or no-passing). In such a case, since an image of a figure or a character string indicating the road name of the road or the restriction content are superimposed on the corresponding road surface, the image is visually perceived by the driver as if the image is virtually drawn on the road surface. Hence, a high relationship between the road and the information provided by the image is obtained such that the driver intuitively recognizes the information. In this case, display control is performed such that the display position of the corresponding image is changed at a rate lower than the moving rate at which the viewing position of a given point on the road moves within the display area 700. Accordingly, even when the velocity of the reference vehicle 301 is high, deterioration of viewability by the driver 300 may be controlled against so as to provide information more stably.

In addition, the information providing image is not associated with position information. Even in this case, when information is provided by superimposing such an information providing image on a road surface or the like, display control is performed so as to change the display position of the information providing image at a rate lower than the moving rate at which the viewing position of a given point (e.g., a road surface) moves within the display area 700; this may prevent deterioration in viewability by the driver 300 even at a high velocity of the reference vehicle 301 so as to provide information more stably.

In the above-described embodiment, an information providing image is superimposed on the landscape in front of the vehicle which the driver directly views via the windshield 302 by using an automotive head-up display (HUD) device. However, the present invention is not limited to such examples. For example, a real-time image obtained by imaging a landscape in front of the vehicle with an imaging unit is displayed on a display panel provided in place of the windshield 302, and the information providing image may be displayed in a predetermined display area within the display panel so as to be superimposed on the real time image (landscape image ahead of the vehicle).

Further, according to the above-described embodiment, an illustration is given of oases where information is provided to a driver of a moving body; however, the above-described embodiment (including the modifications) may be applied to cases where information is provided to an occupant who is a non-driver of a moving body (an occupant seated on an occupant seat of a vehicle, an occupant seated on a rear seat, etc.). Further, in the above-described embodiment, a description is given of a case where the information providing image is displayed in the predetermined display area 700 set in the traveling direction of the moving body. However, the predetermined display area may be set on the side (door window, etc.) of the moving body, downward, upward (sun roof and the like), rearward (rear window etc.), and the like to display the information providing image.

The above illustrations are merely examples, and specific effects may be provided for each of the following modes.
(Aspect A)

According to an aspect A, an information providing apparatus (e.g., an automotive HUD device 200) includes a display unit (e.g., a HUD main body 230) configured to display information providing images (e.g., route-specifying images 721-1 and 721-2 and the remaining distance-to-destination image 722, an intersection instruction image 723, and a vehicle velocity display image 704) in a predetermined display area 700, in which an object such as a road surface around, the moving body is visually perceived by an occupant (e.g., a driver 300) of the moving body (e.g., a reference vehicle 301). In such a information providing apparatus, when a display position of the at least one information providing image is changed in a direction in which the viewing position of the object located at a specific point corresponding to the at least one the information image moves within the predetermined display area, the display controller performs display control such that a deviation amount between the display position of the at least one information providing image and the viewing position of the object increases.

According to the aspect A, when the display position of at least one information providing image is changed in a direction, in which the viewing position of an object around the moving body moves within the predetermined display area, so as to follow the movement of the moving body, the changing rate of the display position of the at least one information providing image may be made lower than the moving rate of the viewing position of the object. Accordingly, it is possible to lower the changing rate of the display position of the at least one information proving image, compared to a case where the changing rate of the display position of the at least one information providing image is changed at the same changing rate as the moving rate of the viewing position of the object. As a result, even when the moving velocity of the moving body is high, deterioration in viewability of the information providing image by the driver may be prevented. When attempting to perform display control such that the changing rate of the display position of the at least one information providing image is lower than the moving rate of the viewing position of the object around the moving body, there is a deviation between the viewing position of the object and the display position of the at least one information providing image, and the deviation amount changes in accordance with the movement of the viewing position of the object. In general, it is often the case that the information relating to a point closer to the moving body is more of importance to make an occupant recognize the information relating to that point than the information relating to a point away from the moving body. According to the aspect A, when a specific point is away from the moving body, the deviation amount increases, and the deviation amount decreases as the specific point is closer to the moving body, Therefore, when a specific point is at a distance closer to the moving body at which the importance of having the occupant recognize the information is high, a high relationship between the specific point (or an object at that point) and the information on the specific point provided by the at least one information providing image may be obtained. When a specific point is away from the moving body, the deviation amount increases, and there is a low relationship between the specific point (or an object at that point) and the information on the specific point provided by the at least one information providing image. However, since the importance of having the occupant recognize the information of a point away from the moving body is low, it is not a particular disadvantage in providing information.
(Aspect B)

In the aspect A, the display controller performs display control such that the at least one information image is displayed before the viewing position of the object located at the specific point corresponding to the at least one information providing image moves into the predetermined display area. According to this aspect B, it is possible to display the at least one information providing image corresponding to the specific point in advance at an earlier stage where the specific point is away from the moving body. Therefore, information relating to the specific point by the at least one information providing image may be provided to an occupant at an early stage. In addition, by displaying the at least one information providing image at an early stage, it is possible to obtain a long display time of the at least one information providing image.
(Aspect C)

In the aspect A or B, the display controller performs display control such that the changing rate of the display position of the at least one information providing image is lower than the moving rate of the viewing position of the object. According to this aspect C, when the display position of at least one information providing image is changed in a direction, in which the viewing position of an object around the moving body moves within the predetermined display area, so as to follow the movement of the moving body, the changing rate of the display position of the at least one information providing image may be made lower than the moving rate of the viewing position of the object.

Accordingly, it is possible to lower the changing rate of the display position of the at least one information proving image, compared to a case where the changing rate of the display position of the at least one information providing image is changed at the same changing rate as the moving rate of the viewing position of the object.

As a result, even when the moving velocity of the moving body is high, deterioration in viewability of the information providing image by the driver may be prevented.

(Aspect D)

In the aspect D, the display controller performs display control such that the changing rate of the display position of the at least one information providing image changes in accordance with the moving velocity of the moving body. According to this aspect D, it is possible to set the changing rate of the display position of the at least one information providing image to a rate at which the viewability of the at least one information providing image is easily obtained according to the moving velocity of the moving body.

(Aspect E)

In the aspect D, the display controller performs display control such that the ratio K of the changing rate of the display position of the at least one information providing image with respect to the moving rate of the viewing position of the object in the predetermined display area decreases as the moving velocity of the moving body increases. When the moving velocity of the moving body is high, the moving rate of the viewing position of the object around the moving body becomes fast, and the changing rate of the display position of the at least one information providing image also increases, accordingly. However, the changing rate of the display position of the at least one information providing image may be lowered by decreasing the ratio K as the moving velocity of the moving body increases. Therefore, even when the moving velocity of the moving body is high, it is easy to obtain the viewability of the at least one information providing image.

(Aspect F)

In any one of the aspects A to E, the moving body moves on a traveling surface such as a road surface, and the predetermined display area 700 is configured so as to be superimposed at a position at which the traveling surface existing in a moving body traveling direction is visually perceived by an occupant of the moving body. According to this aspect F, it is possible to make an occupant visually perceive the information providing image as if the information providing image is drawn virtually on a traveling surface.

(Aspect G)

In any one of the embodiments A to H, an image light projection unit such as a HUD main body 230 or the like configured to project image light onto a transreflective member such as a windshield 302 is used as the display unit so as to display the information providing image in the predetermined display area 700, in which an object around the moving body is visually perceived by an occupant of the moving body via the transreflective member. According to this aspect G, it is possible to achieve an information providing apparatus for displaying an information providing image via a HUD device.

(Aspect H)

In the aspect G, the image light projection unit is configured to display the information providing image as a virtual image I within the predetermined display area with projected image light, and a distance from an occupant to the virtual image I is 4 m or more. As described above, an occupant of a moving body during moving frequently focuses on a distant point. When the distance from the occupant to the virtual image I is 4 m or more, the movement amount of the lens of the eyeball is reduced, as compared with a conventional general distance of 2 m. As a result, it is possible to shorten the focus adjustment time for adjusting a focal point to the virtual image I so as to visually perceive information provided by the information providing image with the virtual image I quickly, and also to reduce the fatigue of the occupant's eyeballs.

(Aspect I)

In the above aspect G or H, the image light projection unit I is configured to cause an optical scanner such as an optical scanning device 208 to two-dimensionally scan image light emitted from a light emitter such as a light source unit 220 and project the image light onto the transreflective member, so as to display the information providing image within the predetermined display area. As described above, according to this aspect, a large virtual image I may easily be displayed with higher luminance, compared to a system using a liquid crystal display (LCD), a fluorescent display tube (VFD), or the like. Further, according to this aspect, it is possible to completely eliminate light in a non-image portion by not allowing the light emitter, to emit the image light corresponding to the non-image portion of the virtual image I. Therefore, it is possible to prevent the viewability of an object around the moving body through the non-image portion from being lowered by light emitted from the light emitter, to increase the viewability of the object around the moving body.

Advantage of the Invention

According to an aspect of the disclosure, even when the moving velocity of the moving body is high, an excellent effect of controlling the deterioration in viewability of the information providing image may be obtained while maintaining a relationship between an object existing around the moving body and the information providing image.

Further, the present invention is not limited to these embodiments and examples described above, but various variations and modifications may be made without departing from the scope of the present invention.

What is claimed is:

1. An information providing apparatus comprising:
   one or more processors; and
   a memory, the memory storing instructions, which when executed by the one or more processors, cause the one or more processors to:
   acquire, by a display, information on a predetermined position outside a moving body to display an information providing image for providing information associated with the predetermined position as a virtual image; and
   control the display so as to change a display position of the information providing image in accordance with movement of the moving body, wherein
   the display position of the information providing image is changed such that a deviation amount between the predetermined position and a straight line reaching position decreases as a distance between the moving body and the predetermined position decreases, the straight line reaching position being a position at which a straight line passing through a reference point within the moving body and the display position of the information providing image reaches a surface on which the moving body is moving, and the deviation amount upon starting of the change of the information providing image increases as the moving velocity of the moving body increases.

2. The information providing apparatus according to claim 1, wherein the deviation amount upon displaying of the information providing image at an upper end of a predetermined display area increases as the moving velocity of the moving body increases.

3. The information providing apparatus according to claim 1, wherein the deviation amount upon ending of the change of the information providing image is less than or equal to 1 minute of a viewing angle.

4. The information providing apparatus according to claim 3, wherein the deviation amount upon displaying of the information providing image at a lower end of the predetermined display area is less than or equal to 1 minute of a viewing angle.

5. The information providing apparatus according to claim 1, wherein the instructions further cause the one or more processors to:

start displaying the information providing image upon a straight line passing through the reference point within the moving body and the predetermined position being located above a straight line passing through the reference point within the moving body and an upper end of the predetermined display area.

6. The information providing apparatus according to claim 1, wherein the instructions further cause the one or more processors to:

control the display such that a changing rate of the display position of the information providing image is lower than the moving velocity of the moving body.

7. The information providing apparatus according to claim 6, wherein the instructions further cause the one or more processors to:

control the display such that the changing rate of the display position of the information providing image changes according to the moving velocity of the moving body.

8. The information providing apparatus according to claim 7, wherein the instructions further cause the one or more processors to:

control the display such that a ratio of the changing rate of the display position of the information providing image to the moving velocity of the moving body decreases as the moving velocity of the moving body increases.

9. The information providing apparatus according to claim 1, wherein the moving body moves on a traveling surface, and
a predetermined display area is configured so as to be superimposed at a position at which the traveling surface existing in a traveling direction of the moving body is visually perceived by an occupant of the moving body.

10. The information providing apparatus according to claim 1, wherein the display employs an image light projector to project image light onto a transflective member so as to display the information providing image in a predetermined display area via the transflective member.

11. The information providing apparatus according to claim 10, wherein a distance from the reference point within the moving body to the virtual image is 4 m or more.

12. The information providing apparatus according to claim 10, wherein the image light projector causes an optical scanner to two-dimensionally scan image light emitted from a light emitter and projects the image light onto the transflective member so as to display the information providing image within the predetermined display area.

13. A method comprising:

acquiring, by a display, information on a predetermined position outside a moving body to display an information providing image for providing information associated with the predetermined position as a virtual image; and controlling, using one or more processors, the display so as to change a display position of the information providing image in accordance with movement of the moving body, wherein the display position of the information providing image is changed such that a deviation amount between the predetermined position and a straight line reaching position decreases as a distance between the moving body and the predetermined position decreases, the straight line reaching position being a position at which a straight line passing through a reference point within the moving body and the display position of the information providing image reaches a surface on which the moving body is moving, and the deviation amount upon starting of the change of the information providing image increases as the moving velocity of the moving body increases.

14. A non-transitory, computer-readable storage medium storing instructions, which when executed by one or more processors, cause the one or more processors to:

acquire, by a display, information on a predetermined position outside a moving body to display an information providing image for providing information associated with the predetermined position as a virtual image; and control the display so as to change a display position of the information providing image in accordance with movement of the moving body, wherein the display position of the information providing image is changed such that a deviation amount between the predetermined position and a straight line reaching position decreases as a distance between the moving body and the predetermined position decreases, the straight line reaching position being a position at which a straight line passing through a reference point within the moving body and the display position of the information providing image reaches a surface on which the moving body is moving, and the deviation amount upon starting of the change of the information providing image increases as the moving velocity of the moving body increases.

* * * * *